March 19, 1957

G. H. HARRED 2,785,403

WIRE STITCHING MACHINE

Filed Feb. 8, 1955

INVENTOR:
George H. Harred
BY
ATTORNEYS.

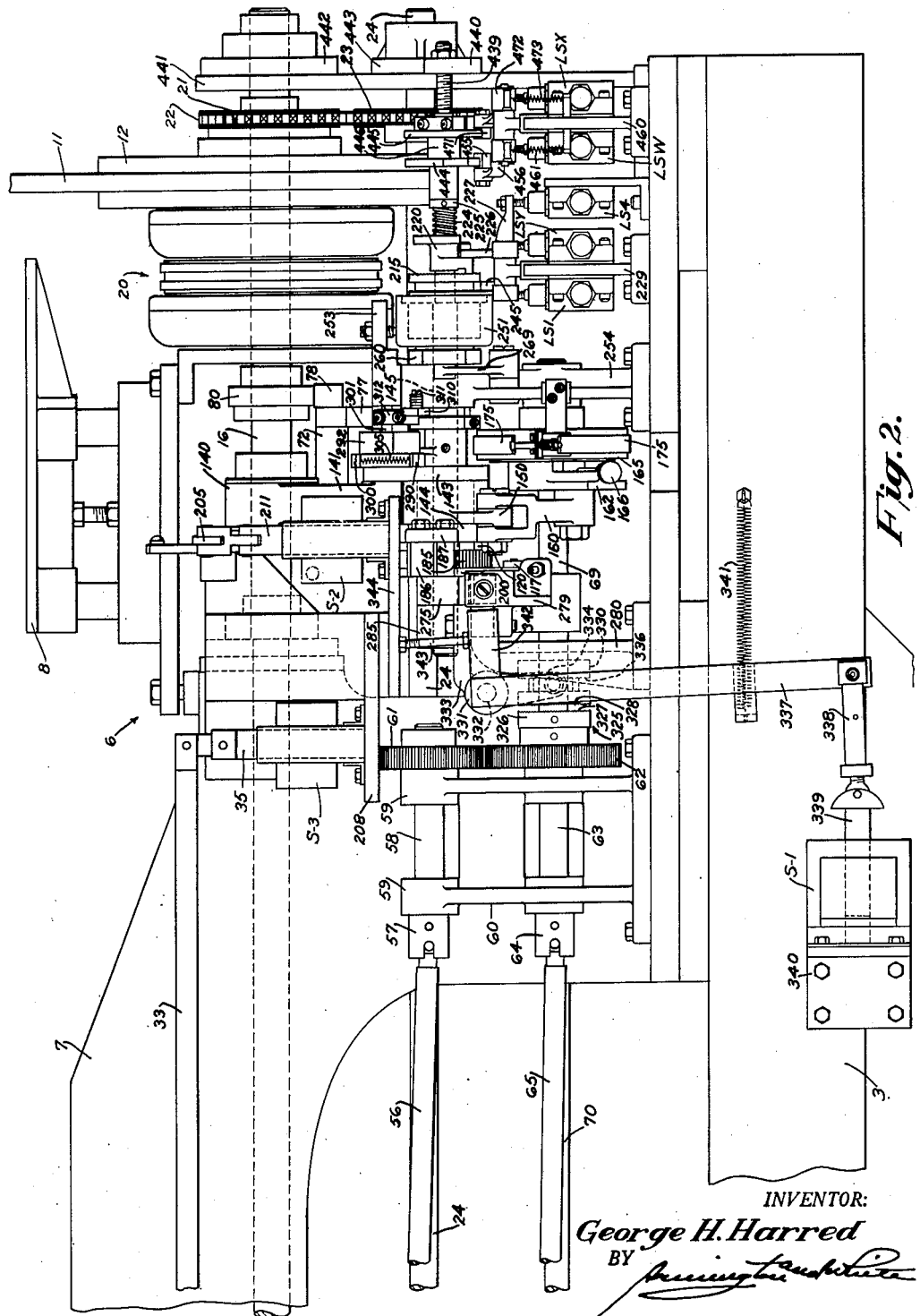

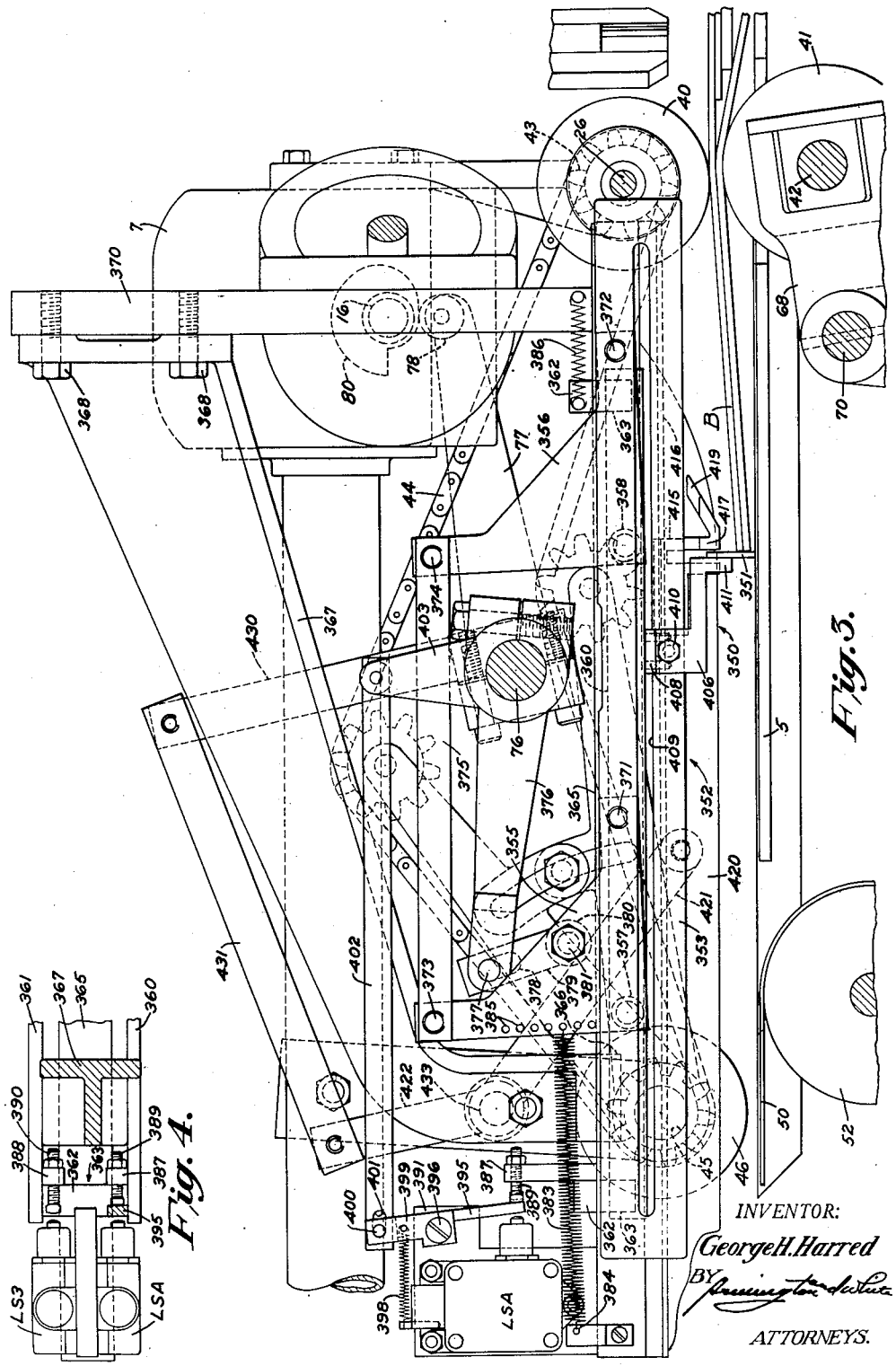

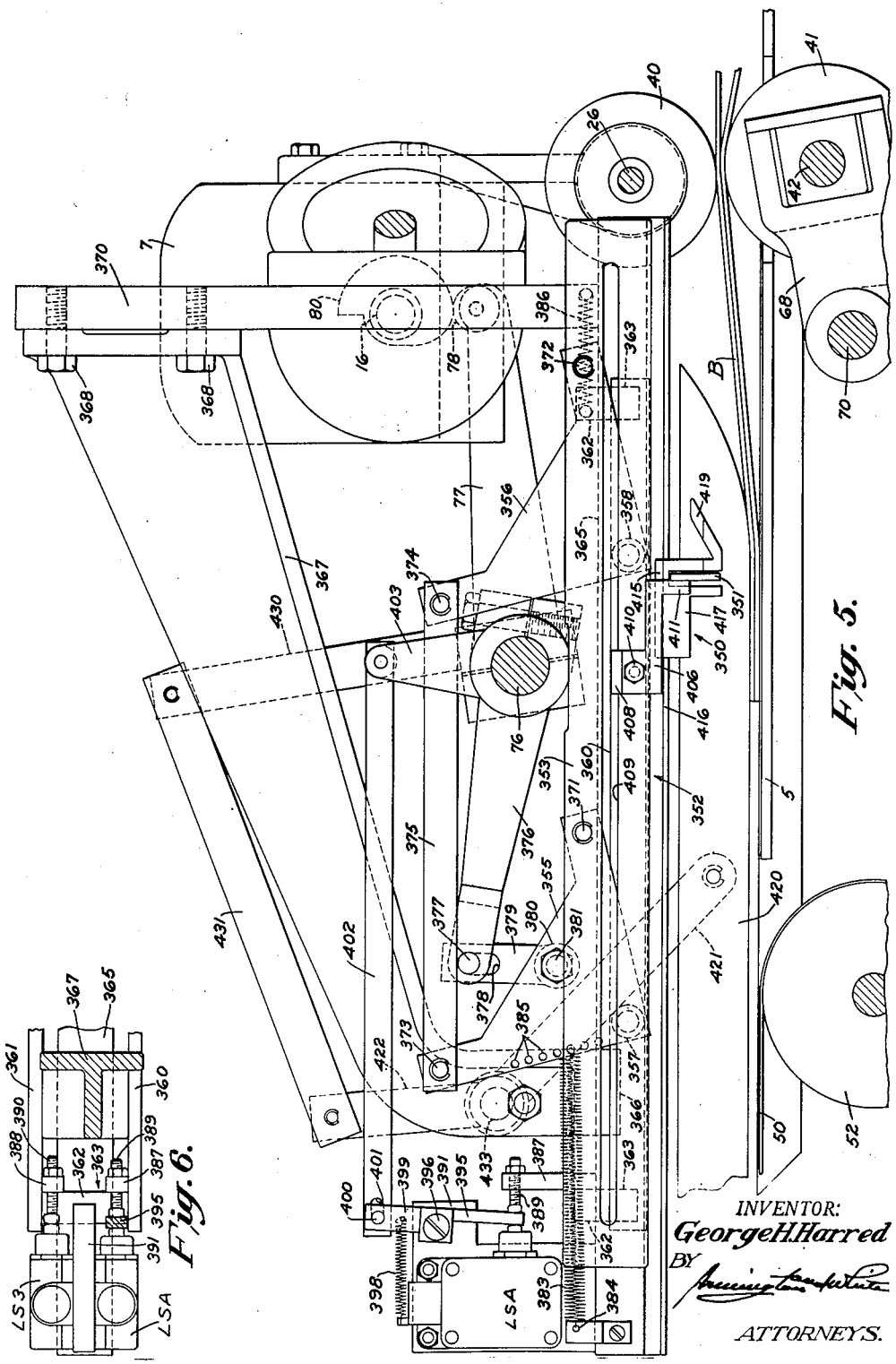

INVENTOR:
George H. Harred

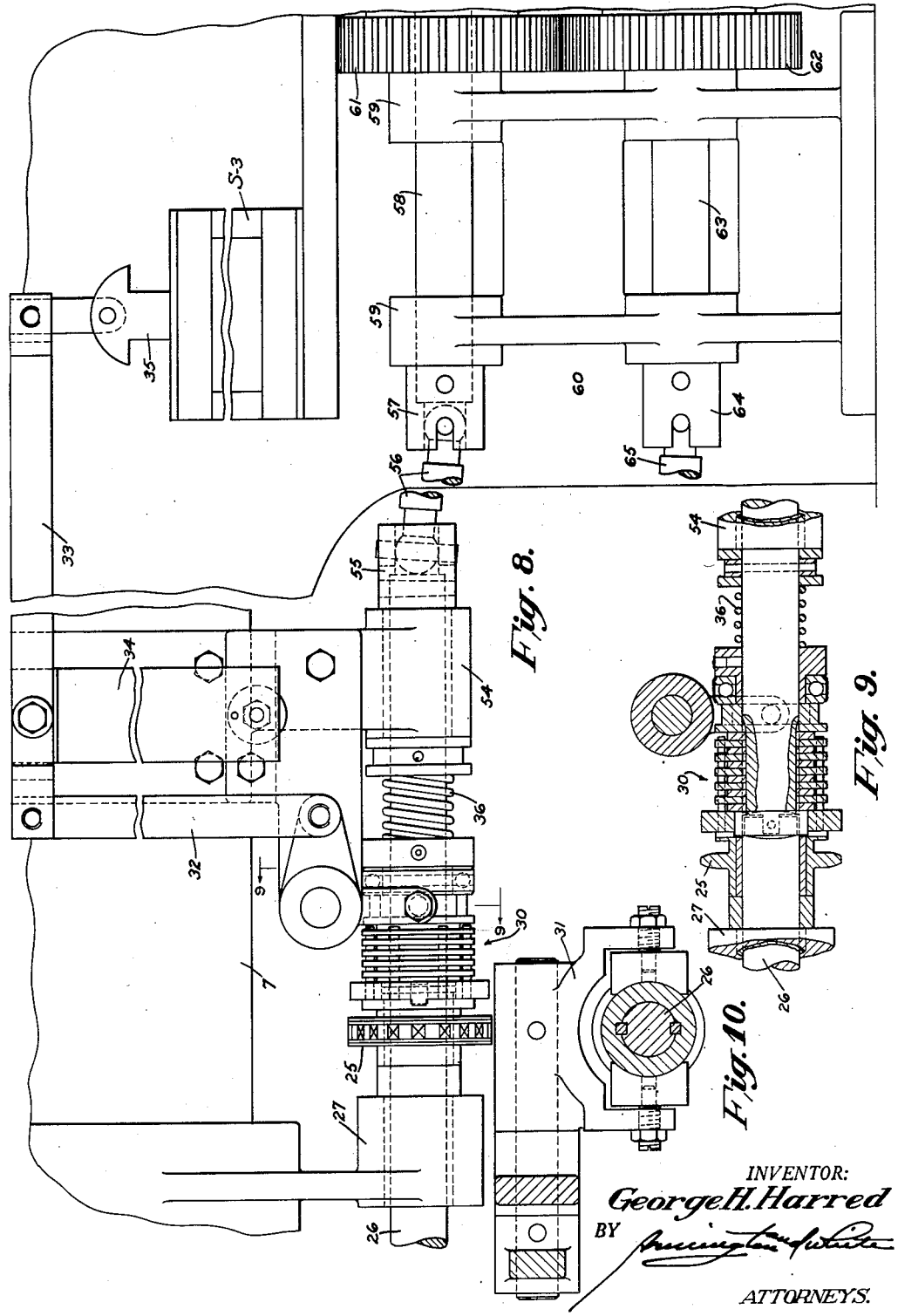

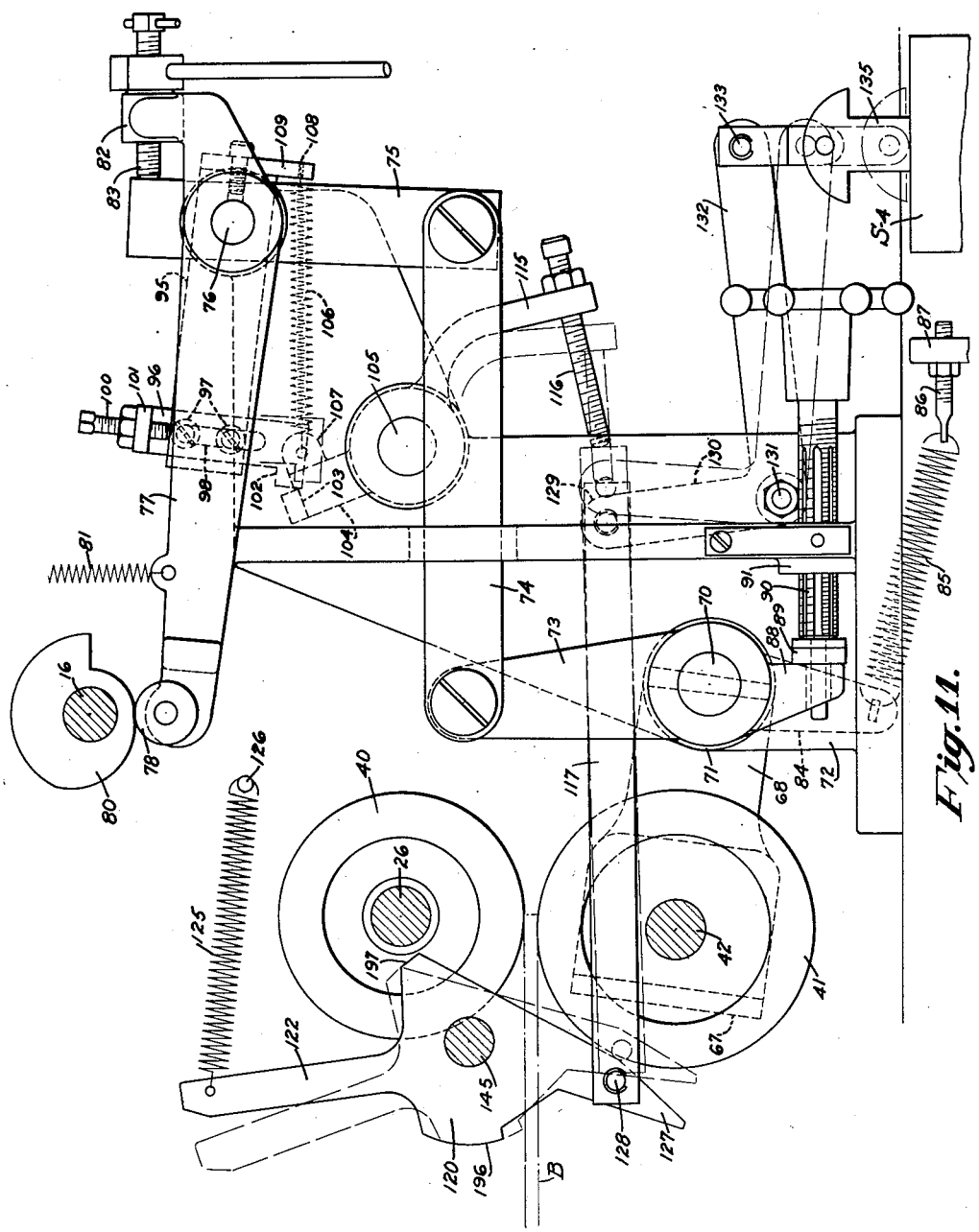

March 19, 1957 G. H. HARRED 2,785,403
WIRE STITCHING MACHINE
Filed Feb. 8, 1955 16 Sheets-Sheet 8

INVENTOR:
George H. Harred
BY
ATTORNEYS.

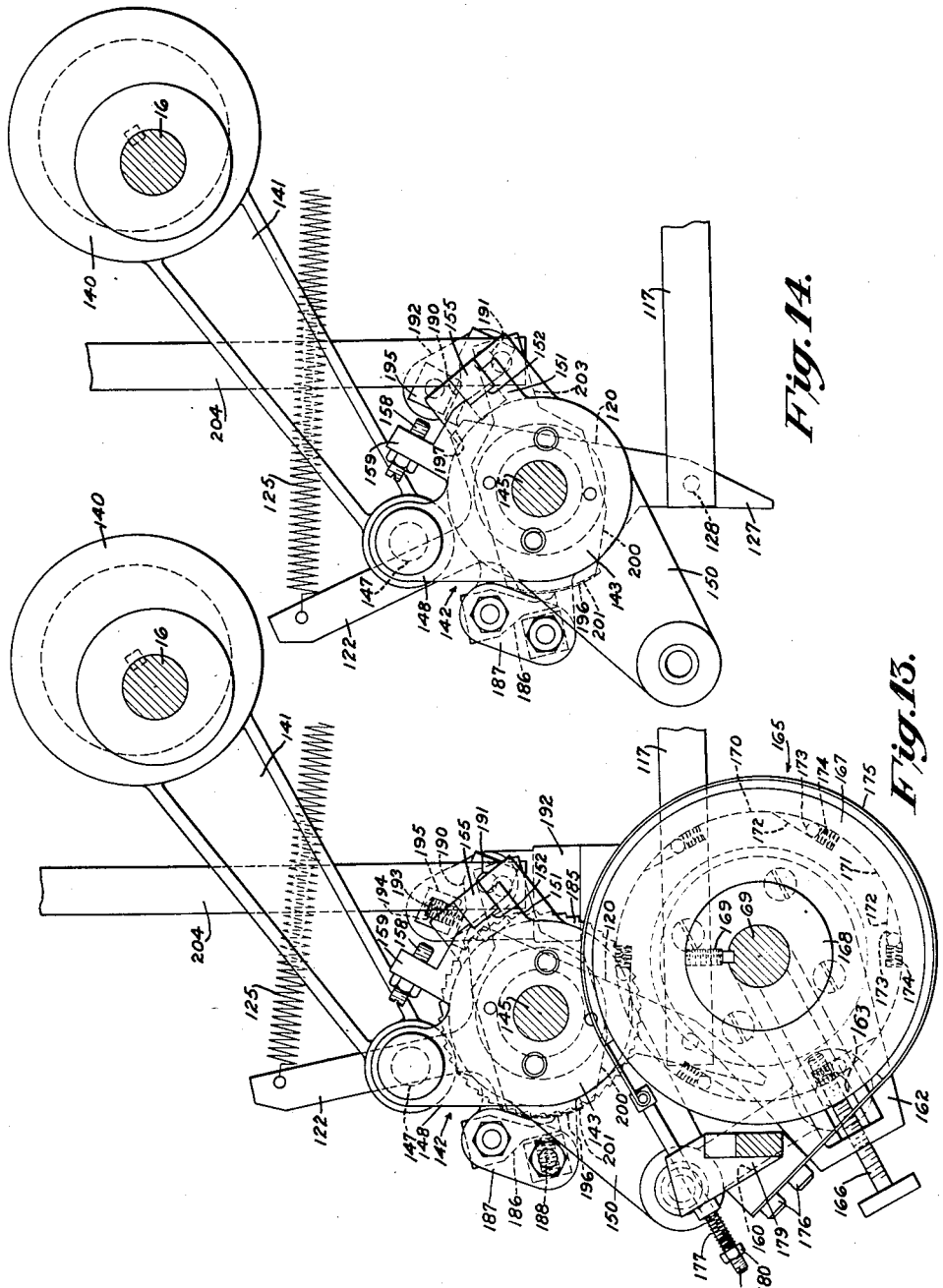

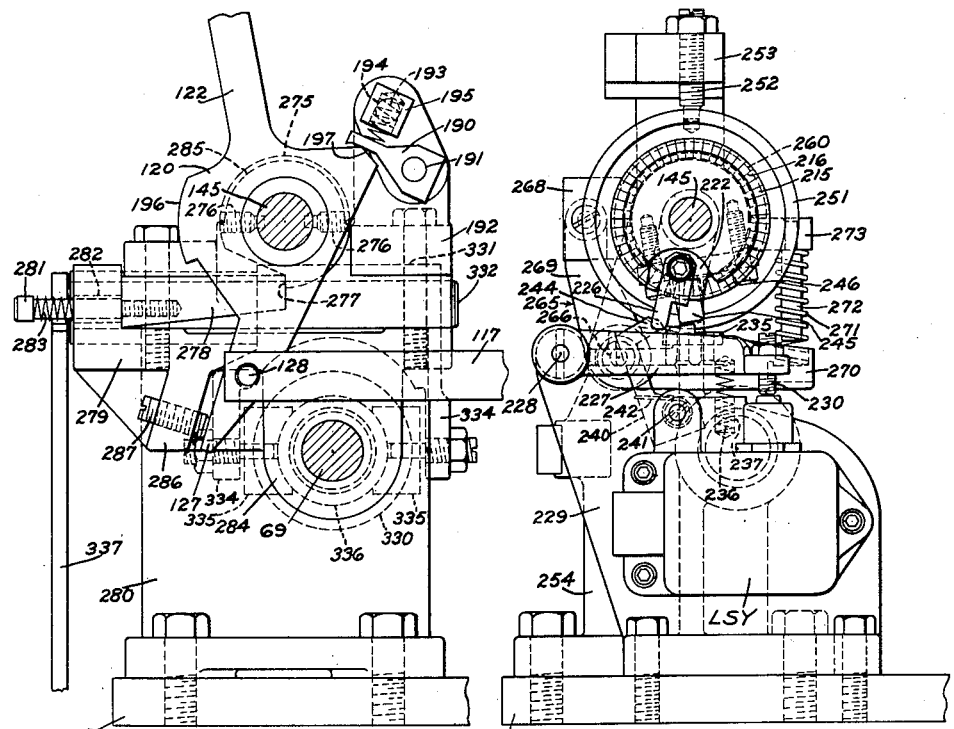
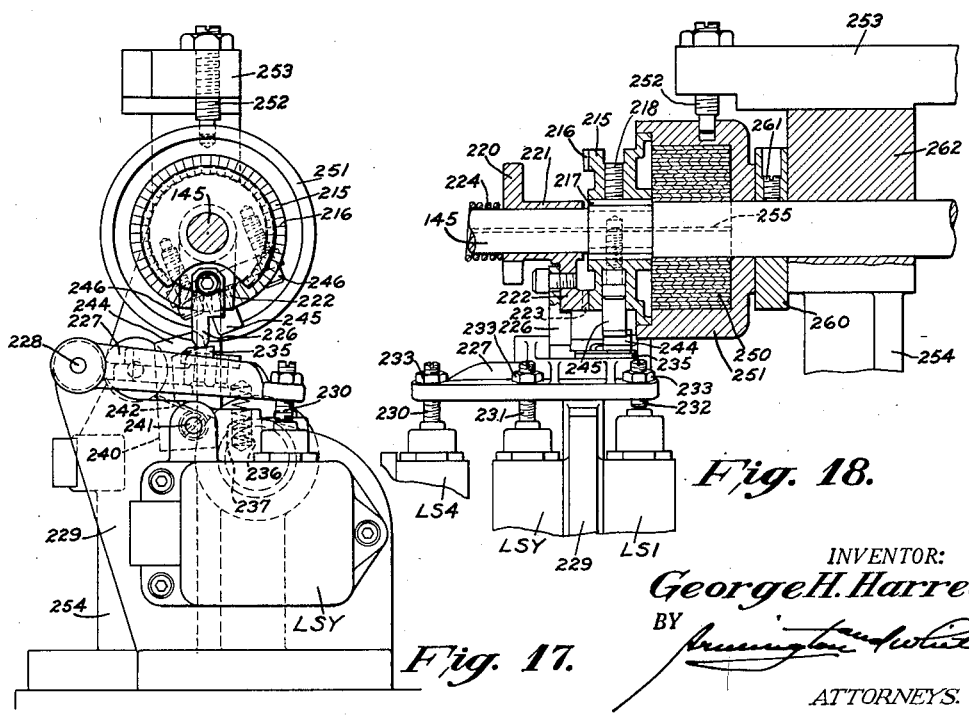

March 19, 1957 G. H. HARRED 2,785,403
WIRE STITCHING MACHINE
Filed Feb. 8, 1955. 16 Sheets-Sheet 11
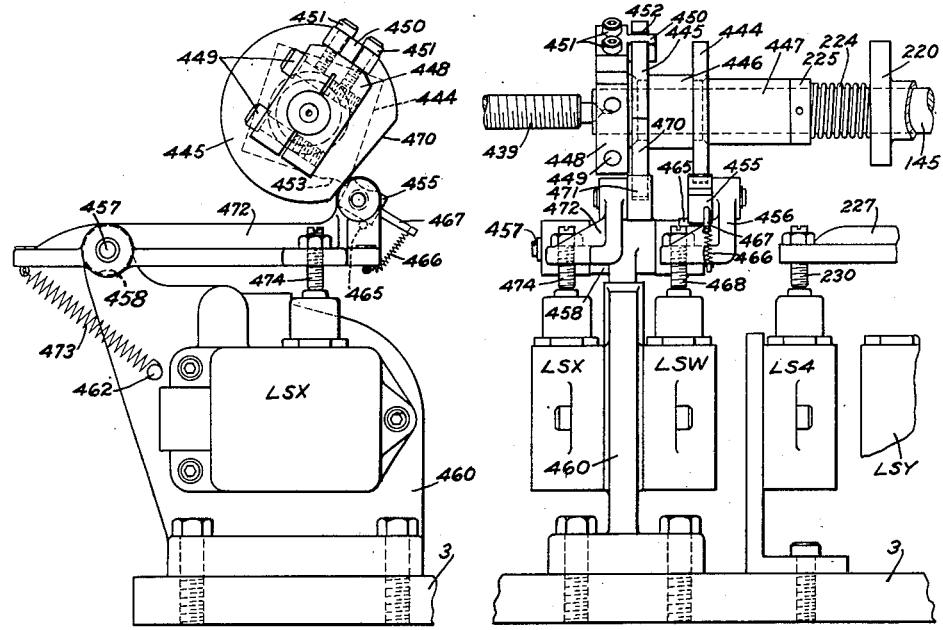
Fig. 19. Fig. 20.
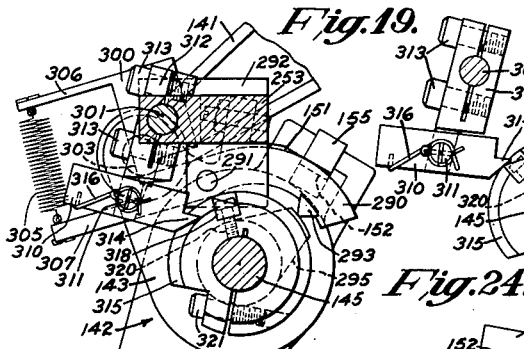
Fig. 24.
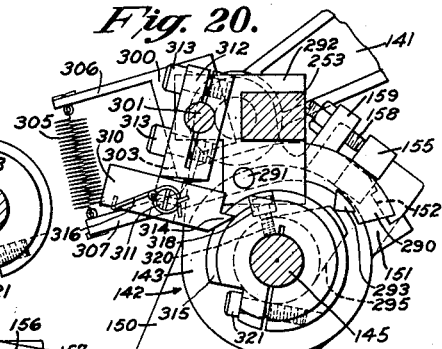
Fig. 25.
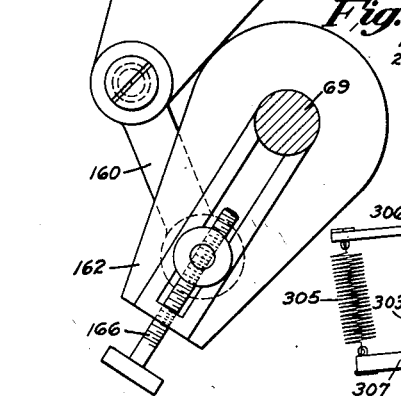
Fig. 21.
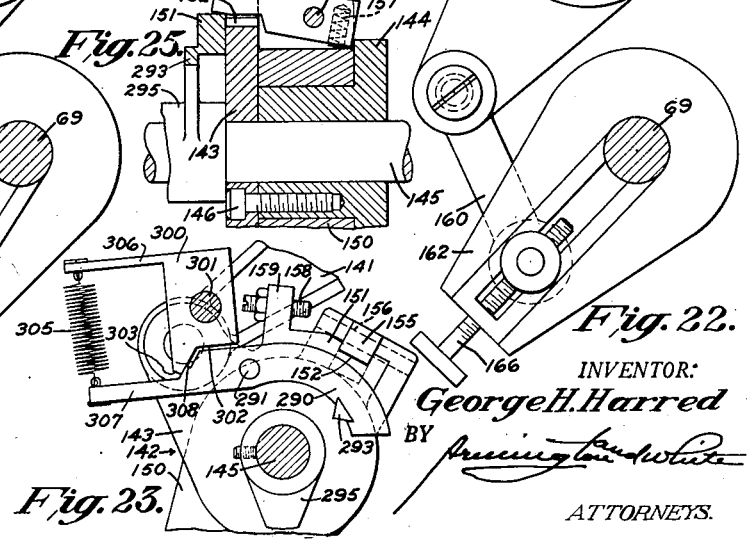
Fig. 22.
Fig. 23.
INVENTOR:
George H. Harred
BY
ATTORNEYS.

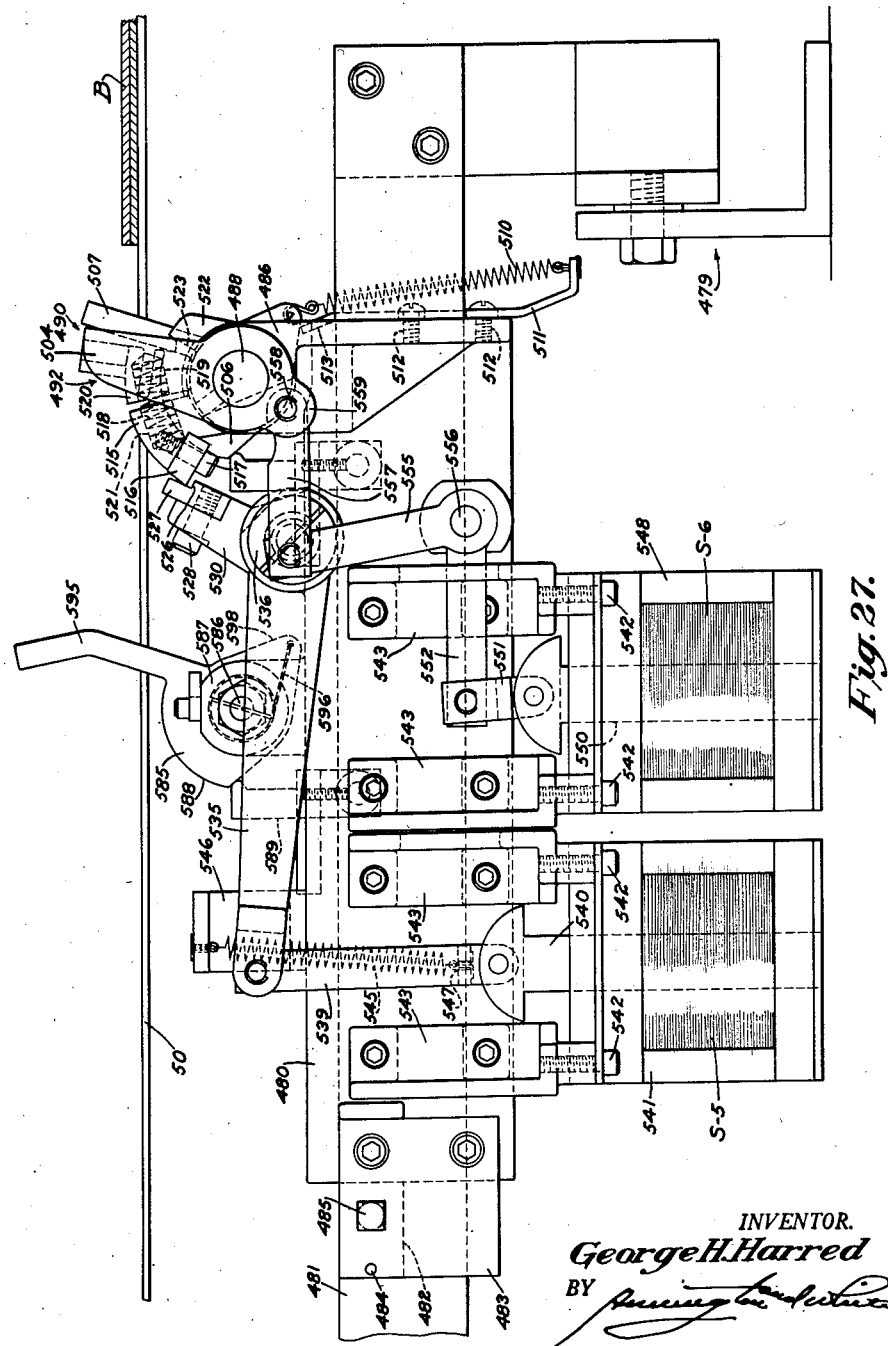

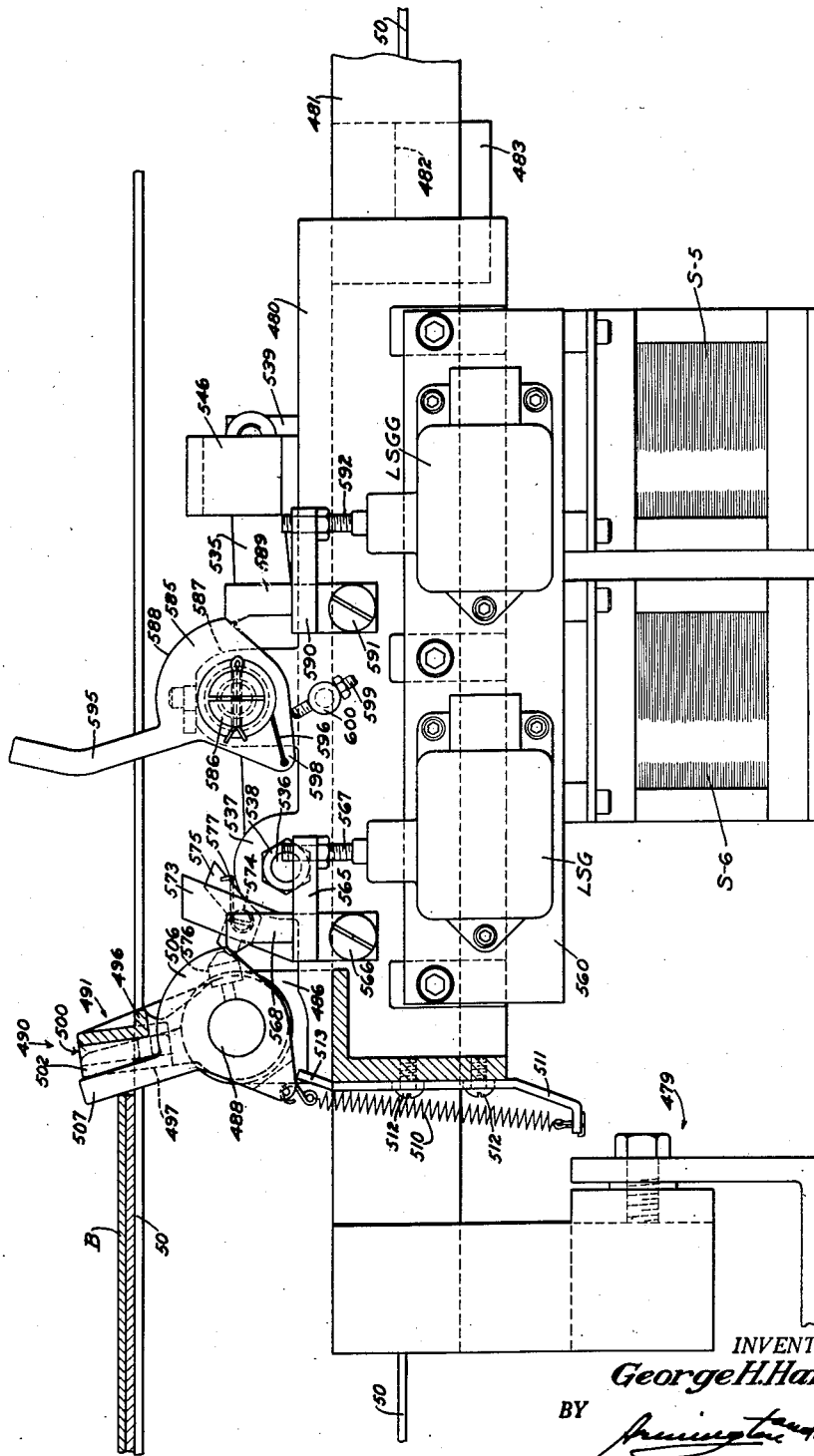

March 19, 1957 G. H. HARRED 2,785,403
WIRE STITCHING MACHINE
Filed Feb. 8, 1955 16 Sheets-Sheet 15

INVENTOR:
George H. Harred
BY
ATTORNEYS.

March 19, 1957　　　G. H. HARRED　　　2,785,403
WIRE STITCHING MACHINE
Filed Feb. 8, 1955　　　16 Sheets-Sheet 16

Fig. 35.

KEY
C1,2 — CAPACITORS
CR1,2,3,4,5,6 — CONTROL RELAYS
FB1 — FUSE BLOCK CARTRIDGE
FB2 — FUSE BLOCK BUSS
L — LAMP
M1 — MAGNETIC STARTER SWITCH
P1,2 — POTENTIOMETERS
R1,2 — RECTIFIERS
SW1 — OVER EXCITATION TOGGLE SWITCH
TB1,2,3 — TERMINAL BOARDS
1,2 OL — OVERLOAD SWITCHES

INVENTOR:
George H. Harred
BY
ATTORNEYS.

_United States Patent Office_

2,785,403
Patented Mar. 19, 1957

2,785,403

WIRE STITCHING MACHINE

George H. Harred, Westerly, R. I., assignor to Bostitch, Inc., Stonington, Conn., a corporation of Rhode Island Application February 8, 1955, Serial No. 486,947

22 Claims. (Cl. 1—104)

This invention relates to wire-stitching machines for stitching the seams of fiber boxes and cartons, more particularly the so-called manufacturer's seam in slotted containers to adapt them to be opened up in hollow or tubular form prior to folding their flaps to close their ends.

The present invention consists in improvements in previous types of machines, being directed to means for controlling the placing of the last stitch or stitches in a seam to insure that they may be accurately spaced from the end of the blank without overlapping the edge at the end of the carton.

In general, the present machine embodies mechanism similar to that disclosed in my U. S. Letters Patent Nos. 2,266,550; 2,291,225; 2,305,418 and 2,305,419 with the improved stitch-locating means applied to use in connection therewith. In certain instances a so-called tie-stitch is applied at the start of the seam and the end thereof and the present machine is adapted to selectively apply such tie-stitches while also controlling the location of the last stitch whether a single stitch or the stitch next to the tie-sitch.

Heretofore the method for locating the last stitch in the seam spaced at a distance from the end of the carton-blank has been to adjust the machine for applying a certain number of stitches proportionate to the length of the carton in accordance with its dimensions and in some instances, due to variations in the size of the blank or other irregularities therein, the last stitch in the seam may be applied at a point too close to the end of the box or carton or even to overrun its end.

One object of the present invention is to provide means controlled by the feeding of the blank during its advance to accurately locate the final stitch in such relation to the previously-applied stitch as to insure placing it within the confines of the carton at a suitable distance from the end thereof.

Another object of the invention is to provide means which may be set to apply the last stitch in the seam only slightly spaced away from the previously-laid stitch to serve as a tie-stitch for more securely fastening the flaps of the carton in overlapping relationship without chance of their being released at the ends of the seam, for example, by prying them open.

Another object is to provide a machine of the present type which may be adjusted for cartons folded from blanks of varying lengths to apply staples for stitching the manufacturer's seam thereof with utmost precision and accuracy not affected by irregularities in the blanks.

Another object is to provide a machine of the present type which can be adjusted for stitching the manufacturer's seam in carton-blanks either with or without a tie-stitch at each end and which will operate continuously to feed the blanks one after another through the machine without further attention on the part of the operator.

Another object is to provide a machine of the type indicated in which the placing of the last stitch in the seam is regulated by the feeding blank itself through contact of its forward edge with the gate of a register-gauge unit adapted for adjustment for different lengths of blanks.

Another object is to provide a machine in which the register-gauge unit operates electrical switches for actuating the means which controls the placing of the last stitch in the seam.

A further object is to provide an automatic machine of the present type of rugged construction, capable of continuous operation at high speed and proof against derangement or getting out of order over long periods of time.

The present improved machine and its stitch-locating means are disclosed herein, by way of example, as described in the following specification illustrated by the accompanying drawings. In the drawings:

Fig. 2 is an enlarged elevational view at the end of the machine shown with certain of the control mechanism for the feed roll drive;

Fig. 3 is a still further enlarged view showing the feed rolls and the trip-gauge for controlling the operation of the feed rolls and the stitcher head;

Fig. 4 is a detailed view of the switches for controlling the drive to the feed rolls and stitcher head;

Fig. 5 is a view similar to Fig. 3 showing the trip-gauge released after the machine has started to operate;

Fig. 6 is a view similar to Fig. 4 showing the switches as actuated;

Fig. 8 is a view of the clutch for the high-speed drive showing the solenoid-operated means therefor;

Fig. 9 is a longitudinal sectional view of said clutch;

Fig. 10 is a sectional view on line 9—9 of Fig. 8 showing the clutch shifting means;

Fig. 11 is a view of the lower feed rolls lifter-mechanism shown with the rolls in normal feeding relationship;

Fig. 13 is a detailed view of the eccentric-actuated ratchet drive to the control shaft and one-way clutch which operates the intermittent drive-shaft;

Fig. 14 is a detailed view of the ratchet-operated drive for the control shaft and cams for releasing the same;

Fig. 15 is a view of the releasing means for permitting return of the control shaft after one operation and the means for arresting the return of said shaft;

Figs. 16 and 17 are views showing the dial for setting the control shaft and the electrical switches actuated from said control shaft;

Fig. 18 is an axial sectional view of the same showing the clock-spring for returning the control shaft to initial position;

Fig. 19 is a view of the cam-operated switch for unlocking the gate of the register-gauge unit;

Fig. 20 is a view of said switch with the additional switch for releasing the control shaft and also the switch for actuating the clutch to arrest the operation of the machine;

Fig. 21 is a further detailed view of the adjustable crank-motion for the intermittent drive shaft of the feed rolls and the tie-stitch mechanism;

Fig. 22 is a similar view showing the tie-stitch mechanism as operative to produce lost motion during the intermitent feed;

Fig. 23 is a fragmentary view of the latching means for the tie-stitch mechanism shown as inoperative;

Fig. 24 is a detailed view of the trip-latch for the tie-stitch mechanism;

Fig. 25 is an axial sectional view of the oscillating means and the key for connecting it to move as a unit;

Fig. 27 is a side elevation of the staple-register unit showing the solenoids for releasing the gate and thereafter returning it to normal position;

Fig. 28 is a view of the same looking in the opposite direction and showing the switches for controlling the operation of said solenoids;

Fig. 35 is a wiring diagram of the electrical circuits including the switches, relays, and solenoids for operating the various mechanisms of the machine.

General organization of machine

Figure 1:
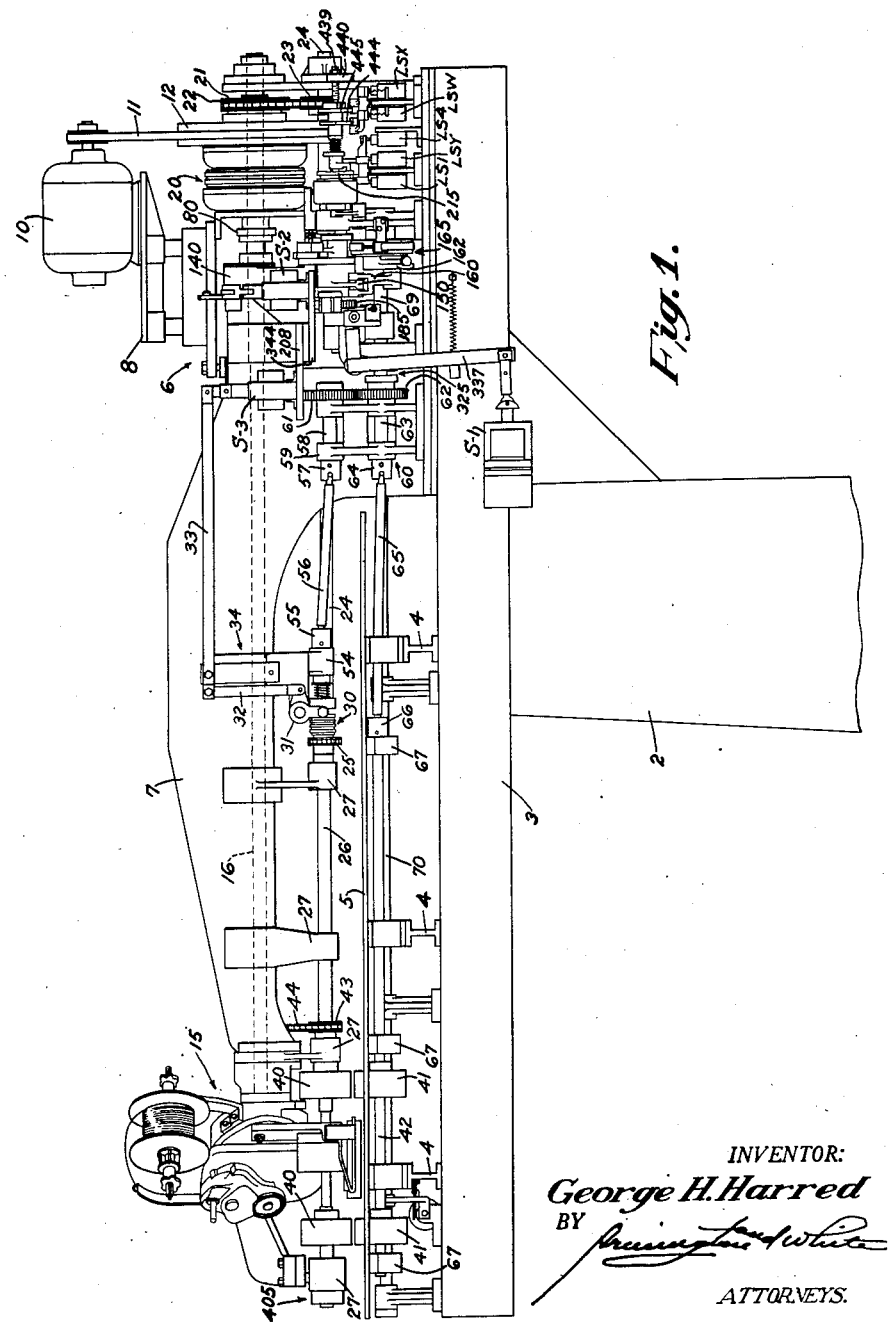
Fig. 1 is a front elevational view of the complete machine shown with certain of the parts eliminated for the sake of clarity.

The present machine is generally of the same construction as that disclosed in my prior U. S. Letters Patent No. 2,305,419. The machine is supported from the floor by a column or pedestal 2 surmounted by a horizontal platform 3 on which the various parts of the mechanism are mounted. A series of brackets 4 rising from the platform 3 support a horizontal table 5 across which the blanks feed. Mounted on the right-hand overhanging end of the base 3 is the main frame 6 of the machine extending in an overhanging arm 7 at the end of which is the wire-stitcher 15. The wire-stitching machine may be of any preferred type and as herein shown it comprises a head in which are mounted the means for feeding wire to the staple-forming and staple-driving mechanism of well-known construction. The stitcher-head 15 is driven by a horizontal shaft 16, shown by dotted lines in Fig. 1 as extending rearwardly from the head to the opposite end of the machine and journaled in suitable bearings.

Driving connections

Mounted above the frame 6 on a platform 8 is an electric motor 10 having its shaft connected by a belt 11 to a fly-wheel 12 which is normally free to rotate on the shaft 16. An electromagnetically-operated combined clutch-and-brake 20 on the shaft 16 is employed for connecting the fly-wheel 12 to drive the stitcher-head 15 and other parts of the machine. A sprocket-wheel 21 fast on the hub of the fly-wheel 12 is connected by a chain 22 to drive a sprocket 23 fast on a shaft 24 journaled in bearings on the rearward side of the frame 6 (Fig. 2). The shaft 24 may be considered the main drive for the machine, being connected by a chain to a sprocket 25 (Fig. 1) for driving a forwardly located horizontal shaft 26 journaled in suitable bearings 27 in the machine frame. The sprocket 25 is normally free to rotate on the shaft 26, being connected to drive said shaft through a clutch 30 shown in detail in Figs. 8–10. The clutch 30 may be of the multi-disk type and operated by means of a forked bell-crank shipper-lever 31. Connected to one arm of the shipper-lever 31 is a link 32 joined to a rockable lever 33 pivoted on a bracket 34 attached to the side of the arm 7. The link 32 is pivotally connected to the short arm of the lever 33 which has its long arm reaching laterally to the right and pivotally connected at its end to the armature 35 of a solenoid S–3. Normally, the clutch is held engaged by means of a coiled spring 36, being adapted to be released by the pivoting of the bell-crank lever 31 in counter-clockwise direction. Release of the clutch in this manner is effected by energization of the solenoid S–3 for drawing its armature downwardly and thereby rocking the lever 33 to raise its shorter arm and lift the link 32. The solenoid S–3 (Fig. 35) is energized by a switch LS3 in its circuit as described more fully hereinafter.

Feed roll drive

The shaft 26 drives the pair of upper feed rolls 40 fast thereon which cooperate with the bottom rolls 41 fast on a shaft 42 and driven thereby. A sprocket 43 on the shaft 26 is connected by a chain 44 to a rearward shaft 45 (Fig. 3) which carries an auxiliary roller 46, not herein described in detail as its only function is to hold down the forward end of the blank as it travels onto the conveyor belts 50 for delivering the blanks from the machine after their seams have been stitched. The conveyor belts 50 are driven by suitable pulleys indicated at 52 in Fig. 3 but not herein shown in detail. The shaft 26 extends through the clutch 30 and a bearing 54 at the lower end of the bracket 34 and carries a universal joint 55 at its end. By this means it is connected to a shaft 56 having its opposite end connected by a universal joint 57 to a stud-shaft 58 journaled in spaced bearings 59 on a double bracket 60. On the opposite end of the shaft 58 is a spur gear 61 meshing with a similar gear 62 on a shaft 63, also journaled in bearings on the bracket 60. The opposite end of the shaft 63 is connected by a universal joint 64 to a shaft 65 joined at its opposite end by a universal joint 66 to the shaft 42 carrying the lower feed rolls 41.

Lower feed roll pressure control

The lower pair of feed rolls 41 are adapted to be moved to a slight extent toward and away from the upper feed rolls 40, for a purpose later explained, by means shown in Fig. 11 of the drawings. The lower feed roll shaft 42 is journaled in bearing bosses 67 at the ends of relatively short arms 68 forming a sort of cradle therefor. The hubs of the arms 68 are pinned to a rockable shaft 70 journaled in a bearing 71 on a bracket 72. Fast on the rock-shaft 70 is a lever 73 which is pivotally connected at its upper end to a lever 75 by means of a link 74. The lever 75 is rockable on a shaft 76 held in a bearing on an extension of the bracket 72 with a portion of said lever projecting thereabove. Fast on the shaft 76 is a lever 77 carrying a roller 78 at its outer end engageable with a cam 80 of involute shape on the main drive shaft 16. A helical spring 81 attached to the lever 77 maintains the roller 78 bearing against the periphery of the cam 80 while the opposite end of the lever 77 has a short arm 82 carrying an adjustable set-screw 83 which bears against the upper end of the lever 75 to rock the latter when the lever 77 is depressed by the cam 80. By this means the lever 75 operates through the link 74 to rock the lever 73 for raising the arms 68 of the cradle to elevate the lower feed rolls 41. As explained in my prior U. S. Letters Patent No. 2,305,419, the purpose of this last-described mechanism is to increase the contact of the rolls on the carton-blanks B for insuring positive feeding thereof during a stitching operation. As the operation of the stitcher head 15 is started to apply the staples the rolls 41 are retained in raised relationship and the blank is fed step-by-step or intermittently to apply the staples to the seam.

Fast on the rock-shaft 70 is an arm 84 projecting downwardly therefrom with a spring 85 connected to its lower end. The opposite end of the spring 85 is anchored to a threaded pin 86 secured at 87. The spring 85 tends to rock the lever 73 in counter-clockwise direction to hold a depending arm 88 on said lever against a locating abutment 89 on a hand-operated screw 90. The screw 90 is threaded through a bearing 91 on the vertical flange of the bracket 72 and by turning it the position of the cradle arms 68 and thereby the raised relationship of the lower rolls 41 can be initially adjusted.

*Locking means for lower feed roll cradle*

Figure 12:
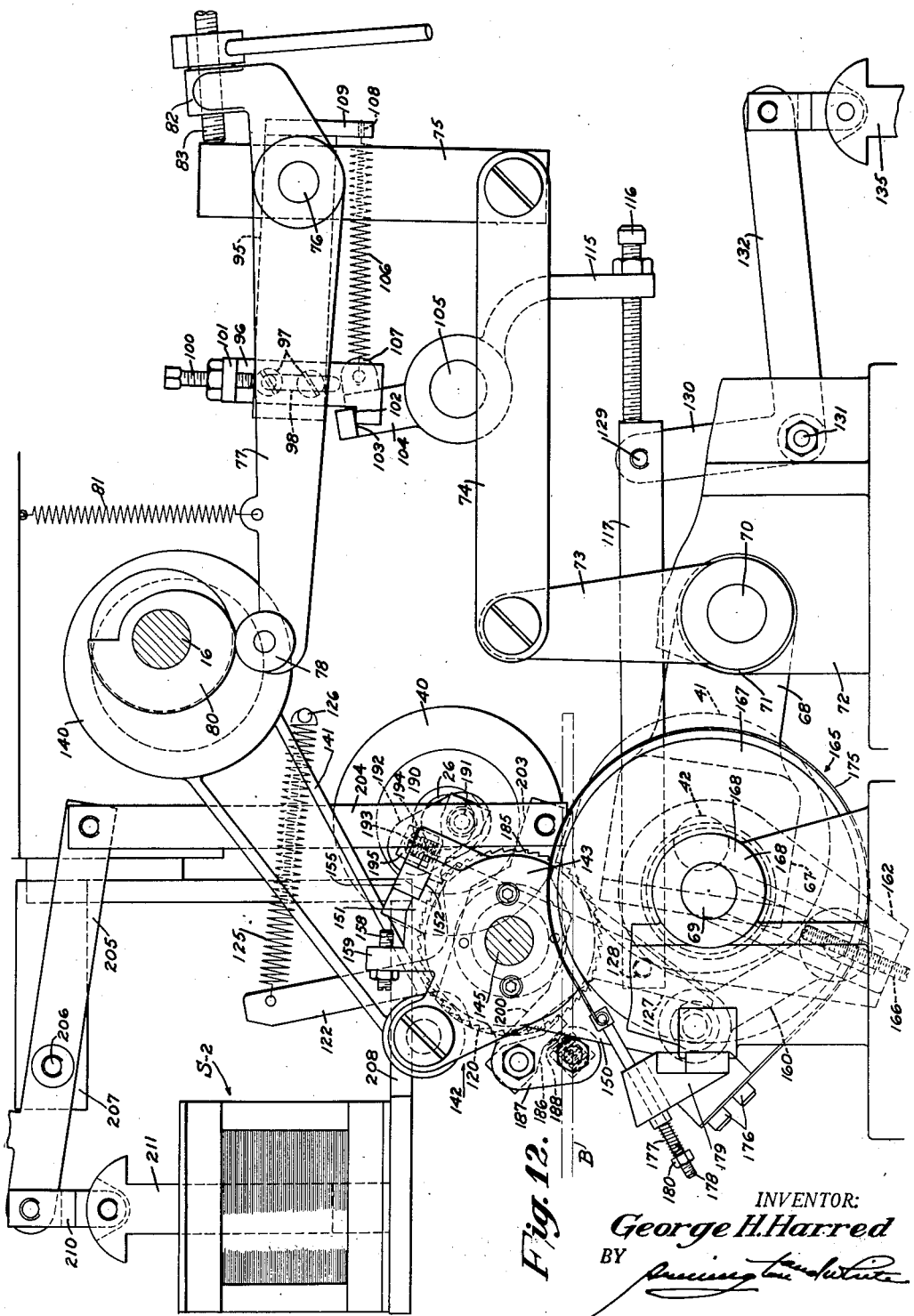
Fig. 12 is a view similar to Fig. 11 showing the means for raising the lower feed rolls to apply a positive grip for the intermittent or step-by-step feed in applying the staples.

As described in my prior patent last referred to, the lower rolls 41 are retained in elevated relationship when the cam 80 operates to depress the lever 77. The detent-means for locking the lever 77 in depressed relationship comprises an arm 95 fast on the shaft 76 (Figs. 11–12) and carrying a member 96 fastened adjustably to the side thereof by screws 97 passing through a slot 98 therein. A set-screw 100 threaded through a nut abutting a lug 101 at the upper end of the member 96 provides convenient means for adjusting it vertically on the arm 95. The member 96 is formed at its lower end with a detent-shoulder 102 engageable with a cooperating shoulder 103 on a lever 104 which is rockable on a stud 105 held in a bearing on the bracket 72. A spring 106 connected to a lug 107 on the lever 104 is anchored at 108 to a depending lug 109 at the rearward end of the arm 95, thereby tending to rock the lever 104 to engage its detent-shoulder 103 with the shoulder 102 on the member 96 when the lever 77 is depressed by the cam 80; the purpose being to maintain the lower feed rolls in their elevated relationship during the step-by-step feeding of the blank under the stitcher head. The detent-means is adapted to be released to permit the lever 77 to rise and cause it to rock the cradle carrying the lower rollers 41 downwardly to slightly release the pressure of the rolls on the blank for initially feeding it to the stitcher head 15 at high speed. The locking lever 104 has a downwardly extending curved arm 115 carrying an adjustable set-screw 116 disposed with its end engageable with the end of a slidable bar 117. The bar 117 serves as means for actuating a cam-plate 120, later described, which regulates the action of control means, later described. Suffice it to state herein that the cam-plate 120 is mounted on the control-shaft 145, later described, and has an upstanding arm 122 connected to a spring 125, the opposite end of which is anchored at 126. The bar 117, previously referred to, is pivotally connected to the lower projecting pointed leg 127 of the cam-plate 120 at 128 while its opposite end is pivotally connected at 129 to a bell-crank lever 130 pivoted at 131 on the side of the bracket 72. The opposite arm 132 of the bell-crank lever 130 is pivotally connected at 133 to the armature 135 of a solenoid S–4 which may be energized through means later described. Energization of the solenoid S–4 will draw down the armature 135 to rock the bell-crank lever 130 and slide the bar 117 to the right as viewed in Fig. 12, thereby engaging its end with the end of the set-screw 116 to pivot the lever 104 and release its detent-shoulder 103 from the shoulder 102 on the member 96. The sliding of the bar 117 also rocks the cam-plate 120 against the tension of its spring 125 in the manner and for the purpose later particularly explained.

*Intermittent drive for step-by-step feed*

As in the machines of my prior patents the folded blanks B are supplied to the present machine manually and may be fed in rapid succession to the stitcher head 15 for applying the staples thereto. During this initial feeding of the blanks the sprocket 25 drives through the clutch 30 (Fig. 1) to rotate the feed roll shafts 26 and 42 at a high rate of speed. Then, as the leading end of the feeding blank engages the trip-gauge, later described, the clutch 30 is disengaged by means previously described and the intermittent driving means is connected to drive the lower shaft 63 by means of a second clutch (Fig. 2) later described. The shaft 63 drives the feed rolls through the means of the gears 61 and 62 and shafts 56 and 65 (Fig. 1) which are universally jointed, respectively, to the shaft 26 for the upper rolls 40 and shaft 42 carrying the lower rolls 41.

The shaft 63 is connected to an alining shaft 69 by means of a toothed clutch 325, later described. The shaft 69 is rotated intermittently by oscillating means, next described, to impart a step-by-step feed to the blank during the application of the staples thereto. An eccentric 140 (Figs. 13 and 14) keyed to the shaft 16 which drives the stitcher head 15 is arranged to reciprocate a pitman 141. The pitman 141 is connected to oscillate a member 142 comprising a pair of spaced disks 143 and 144 connected by a screw 146 (Fig. 25) and rotatable on the control shaft 145, the end of the pitman being pivoted at 147 to radial arms 148 on said disks. A crank-arm 150 has its hub positioned between the disks 143 and 144 and is free to turn on a laterally projecting hub on the disk 144. The crank-arm 150 is adapted to be oscillated with the member 142 by a key-and-slot connection therebetween as next described. As shown most clearly in Fig. 14, the disk 143 is formed with a projecting extension 151 in which is a slot 152 adapted to be engaged by a pivoted key 155 shown in detail in Fig. 25. The key 155 is pivoted at 156 on a projecting portion of the crank-arm 150 with a helical spring 157 pocketed at its rearward end which normally rocks the pawl to engage it in the slot 152. The key 155 is releasable from the slot 152 and so disposed when released as to adapt it to engage the end of a set-screw 158 in a radial lug 159 on the disk 143. By this means the angular relationship between the crank-arm 150 and the oscillating member 142 may be altered for a purpose later explained.

*One-way clutch for step-by-step feed*

The crank-arm 150 has its outer end pivoted to a link 160 adjustably connected at its opposite end to a crank-arm 162 mounted on the shaft 69 and employed for rotating the one-way clutch 165 shown in Fig. 13. The adjustment of the link 160 radially of the crank-arm 162 is accomplished by turning a screw 166 threaded into the end of the arm through the pivot-pin. The clutch 165 is of conventional construction comprising a disk 167 having its hub 168 keyed to the shaft 69 by a set-screw 169 and formed with a flanged rim 170. The hub of the arm 162 is fastened to the side of the inner disk 171 of the clutch 165, said disk being free to rotate on the shaft 69 with the outer rim of the disk 171 in engagement with the inner face of the flanged rim 170 of the disk 167. Tapered slots 172 in the periphery of the inner disk 171 contain rollers 173 which are urged by springs 174 for shifting them in said slots to adapt them to frictionally engage the inner rim of the flange 170 to clutch the two disks in driving connection. Through this arrangement the angular movement of the crank-arm 150 imparted thereto by the oscillating member 142 driven by the pitman 141 is caused to rotate the clutch 165 and turn the shaft 69 intermittently in clockwise direction. That is to say, as the crank-arm 150 is rocked clockwise it rocks the arm 162 in the same direction, thereby causing the inner clutch-disk 171 to turn to frictionally engage the rollers 173 with the flange 170 of the outer disk 167; while as the crank-arm 150 rocks in the opposite direction or counter-clockwise the inner clutch-disk 171 is turned in this direction to free the rollers from the flange on the outer disk 167. In this way the clutch 165 drives the shaft 69 intermittently in clockwise direction to rotate the feed-rolls 40 and 41 in the proper direction for effecting the step-by-step feed of the carton-blank during a stitching operation.

A friction band-brake 175 encircling the periphery of the outer clutch-disk 167 has one end anchored at 176 and its opposite end resiliently held by a spring 177 on a slidable rod 178 held in a member 179 of the machine frame. The brake 175 prevents retrogressive movement of the clutch 165, the pressure of the spring 177 being manually adjustable by means of a nut 180 on the threaded end of the rod 178.

A ratchet-disk 185 fast on the control shaft 145, previously mentioned, is positioned on the rearward side of the oscillating member 142 and may be selectively driven from said member 142 by means of an actuating pawl 186. The actuating pawl 186 is pivoted on the side of a projecting portion 187 of the disk 144 with a pocketed spring 188 tending to rock it to engage its toe with the teeth on the ratchet-disk 185 for intermittently rotating the control shaft 145 from the oscillation of the member 142. In the machines of my prior patents the ratchet-disk 185 is employed for counting and registering the required number of staples applied to the carton-blank in accordance with the length thereof; the pawl being released to adapt the ratchet-disk 185 to be returned to first position after applying the predetermined number of staples. Normally, the ratchet-disk 185 is held from retrogressive movement as it is advanced by the actuating pawl 186 by a check-pawl 190 pivoted at 191 to a bracket 192 on the machine frame. The pawl 190 is normally urged into engagement with the teeth by a spring 193 held in a pocket 194 in a projection 195 on the bracket 192. The pawls 186 and 190 are adapted to be released for freeing the ratchet-disk 185 to permit it to return to first position by operation of the cam 120 previously referred to and shown in Fig. 11. As shown in Fig. 11, the cam 120 is of peculiar shape, having its triangular center portion formed with an arcuate edge 196 concentric with the axis of the shaft 145 on which the toe of the actuating pawl 186 is adapted to ride without engagement of the teeth on the ratchet 185. The top of the cam 120 is formed at the right with a straight edge 197 adapted to ride in under the toe of the check-pawl 190 to release the latter from the teeth of the ratchet-disk 185. When the cam 120 is shifted clockwise into the position illustrated by full lines in Fig. 11 the toe of the actuating pawl 186 will be released from the arcuate edge 196 and likewise the check-pawl will be released from the straight edge 197 for both pawls to re-engage the teeth on the ratchet-disk 185. A secondary cam-plate 200 shown by dotted lines in Fig. 14 is also employed for lifting the actuating pawl 186 to disengage its toe from the teeth on the ratchet-disk 185. The cam 200 is pivotally mounted on the control shaft 145 at the opposite side of the disk 185 from the previously-described cam 120 and has a projecting arcuate edge 201 on which the toe of the actuating pawl 186 rides to hold it disengaged from the teeth on the ratchet-disk 185. The opposite end of the cam 200 has a radial arm 203 pivoted to a link 204 (Fig. 12) that is pivotally connected to a lever 205 rockably mounted at 206 on a bracket 207 rising from a shelf 208 supported from the machine frame. The shorter arm of the lever 205 is pivoted to a link 210 connected to the armature 211 of a solenoid S–2 supported on the shelf 208 (Fig. 2).

*Dial for manual setting of control shaft*

Before the machine is started to operate the ratchet mechanism is set by manually-adjustable means on the control shaft 145. Referring to Figs. 16, 17 and 18, a dial 215 having ratchet-teeth 216 surrounding an offset rim on its side has its hub keyed to the shaft 145 at 217 with a set-screw 218 extending radially thereinto against the key. A manually-adjustable member 220 having its hub 221 free to turn on a reduced portion of the shaft 145 is provided with a radially-projecting arm 222 formed with teeth 223. The teeth 223 are adapted to engage the teeth 216 on the dial 215 to connect these last described elements to rotate together as the shaft 145 turns in either direction. A helical spring 224 coiled around the shaft 145 with one end abutting a collar 225 (Fig. 20)

acts to urge the member 220 to the right as viewed in Fig. 18 to maintain its teeth in engagement with the teeth on the dial 215. The periphery of the dial 215 is marked with graduations and indicia starting at "0" and numbered at intervals of five; the graduations corresponding with the teeth thereon and the teeth on the ratchet-disk 185. This provides for adjusting the dial 215 to determine the extent of rotation of the control shaft 145.

Bolted to the arm 222 on the member 220 is a finger 226 projecting radially therefrom for engagement with a switch-operating lever 227 pivoted at 228 on a bracket 229 supported from the frame of the machine. As shown in Fig. 18 the switch-lever 227 is of considerable width to adapt it to mount three adjustable studs 230, 231 and 232 held by suitable lock nuts 233. The studs 230, 231 and 232 are arranged to engage respectively with the plungers of three limit switches LS4, LSY and LS1 connected in circuit with certain solenoids shown in the diagram (Fig. 35) and later described. The control shaft 145 is rotated by the ratchet mechanism, previously described, to turn the toothed dial 215 in counter-clockwise direction to move the finger 226 into engagement with the lever 227 for depressing it from its relationship shown in Fig. 16 to that illustrated in Fig. 17. The end of the finger 226 rides up the beveled end of a plate 235 riveted to the top of the lever 227 which is normally held in raised position by the tension of a spring 236 held in a pocket 237 at the top of the bracket 229. The manual adjustment of the member 220 angularly on the dial 215 thus controls the extent of rotation or indexing of the ratchet-disk 185 and thereby the control shaft 145. After the lever 227 has been depressed it is locked in this position by means of a rockable latch 240 pivoted on a pin 241 in the bracket 229. A helical spring 242 wound about the pivot-pin 241 has one end held in a slot at its end with its opposite end extending radially outward and hooked around the side of the latch 240. The free end of the latch 240 has a detent-projection 244 adapted to engage across a flat face on the plate 235 when the lever 227 is depressed as shown in Fig. 17, the spring 242 acting to rock the pawl for this purpose.

A radial projection 245 fastened in a recess in the member 215 by bolts 246 (Fig. 17) is adapted to strike against the end of the detent-projection 244 on the latch 240 to release it from the lever 227 when the shaft 145 is rotated in clockwise direction. This reverse rotation occurs when the pawls 186 and 190 (Fig. 13), previously described, are disengaged from the teeth on the ratchet-disk 185 to adapt it to be returned to its initial relationship. The control shaft 145 is returned therewith to initial relationship by the action of a clock-spring 250 contained in a cup-shaped casing 251. The casing 251 is held from turning on the shaft 145 by means of a set-screw 252 mounted in an overhanging T-shaped extension 253 of a bracket 254 and having a reduced portion at its lower end engaging a bore in the rim of the casing. The outer end of the spring 250 is anchored in a slot in the rim of the casing 251 while its inner end is held in the keyway 255 on the side of the shaft 145. It will thus be understood that the spring 250 is normally wound up under tension so that when the pawls 186 and 190 are disengaged from the ratchet-disk 185 it will rotate the shaft 145 and the ratchet-disk 185 clockwise to return the disk to its first relationship, this part of the mechanism being substantially the same as that shown and described in my prior patent, No. 2,266,560.

Fast on the control shaft 145 is a brake-disk 260 secured thereto by a set-screw 261 and positioned between the casing 251 and the bearing 262 in which the shaft is journaled. The bearing 262 is at the top of the bracket 254, previously mentioned. A bell-crank brake-lever 265 (Fig. 16) pivoted at 266 on the bracket 254 carries a brake-shoe 268 pivotally mounted on the upper end of its upstanding arm 269. A laterally-extending arm 270 of the bell-crank lever 265 has a pocket at its outer end which supports the end of a helical spring 271 surrounding a pin 272 which is fast in an upper portion 273 of the bracket 254. The spring 271 applies resilient pressure to the arm 270 of the lever 265 to force the brake-shoe 268 against the periphery of the brake-disk 260. The braking force on the disk 270 reacts against the tension of the clock-spring 250 to check too free rotation of the control shaft 145.

The control shaft 145 has mounted thereon a collar 275, shown by dotted lines in Fig. 15 which is fastened to the shaft by means of screws 276. The collar 275 has a portion of its circumference cut away to form a radial shoulder 277 adapted to be engaged by the end of a stop-member 278. The stop-member 278 is held seated against the vertical front face of a projecting portion 279 of a bracket 280 by a screw 281 passing through a slot 282 in the projecting portion of said bracket with a helical spring 283 surrounding the rearward end of the screw and held under compression by the head thereof. By this means the stop-member 278 is yieldingly mounted to adapt its forward end to engage the shoulder 277 for arresting the clockwise rotation of the control shaft 145; the mounting flexibly permitting the member 278 to rock slightly as the flattened portion of the collar 275 passes thereover during counter-clockwise rotation of the shaft 145. The bracket 280, referred to above, has a bearing 284 for the intermittent drive-shaft 69 to the feed rolls and also a pillow-block 285 at the top in which the control shaft 145 is journaled. It will also be noted by reference to Fig. 15 that the forward projecting portion 279 of the bracket 280 has a downwardly-extending rib 286 in which is mounted an adjustable set-screw 287 engageable with the edge of the lower leg 127 of the cam-plate 120 to limit its pivotal motion.

Tie-stitch mechanism

The tie-stitch mechanism is substantially the same in construction and arrangement as that shown in my prior patent, No. 2,291,225, and will be described herein only briefly. As has been stated, the key 155 on the crank-arm 150 is normally engaged in the slot 152 in the oscillating member 142 to connect said elements together to oscillate as a unit. The arm 150 transmits motion to the feed rolls 40 and 41 to effect the step-by-step feed of the carton-blank whereby the stitches are applied in spaced relationship at regular intervals. To apply a tie-stitch at the beginning of the seam and at its end the rocking of the oscillating member 142 is transmitted to the crank-arm 150 with lost motion to shorten its stroke and thereby reduce the increment of motion in the feed of the carton-blank. This is accomplished by lifting the end of the key 155 out of the slot 152 and supporting it thereabove in position to engage its end with the end of the screw 158 in the lug 159 on the disk 143 of said oscillating member 142 (Fig. 22).

The lifting of the end of the key 155 out of the slot 152 is effected by a sickle-shaped element 290 (Figs. 21 and 22) pivoted midway of its ends on a pin 291 held in a block-like mounting 292 on the end of the T-shaped extension 253 (Figs. 2, 18) on the bracket 254. The key-lifter 290 is located beneath the rearward end of the key 155 and has a triangular-shaped insert 293 of hardened metal on its under side. The insert 293 is adapted to be engaged by the arcuate end of a cam-member 295 adjustably mounted on the control shaft 145 for rotation therewith. As the shaft 145 rotates counter-clockwise the cam-member 295 will ride in under and across the insert or contact member 293 to rock the lifter 290 upwardly and disengage the end of the key 155 out of the slot 152 (Fig. 25). The lifter element 290 is locked in its uppermost relationship by means of a latch member 300 fast on a shaft 301 journaled in a bifurcated bearing 292 on the bracket-extension 253. The block-like portion of the latch 300 is cut away at the bottom to provide a beveled face 302 (Fig. 23) terminating in a detent-shoulder 303. Normally, the forward arcuate portion of the key-lifter 290 is rocked downwardly by means of a helical spring 305 tensioned between a rearwardly-extending arm 306 of the latch 300 and the rearward tail-portion 307 of the lifter 290. When, however, the forward end of the lifter 290 is raised by the action of the cam 295 the latch 300 will be rocked to engage its detent-shoulder 303 with a shoulder 308 on said lifter 290 (Fig. 21). The detent-connection is released to allow the lifter 290 to return to initial position by means of a trigger-element 310 pivoted on a pin 311 on a mounting block 312 clamped to the rod 301 by bolts 313. The trigger 310 has a beveled forward end terminating in a shoulder 314 and thus forming a sort of beak, the end of which is adapted to ride on the periphery of a collar 315 (Fig. 22) on the control shaft 145. The trigger 310 is normally held rocked into this position by means of a spring 316 coiled around the pivot-pin 311 with its radially-extending end hooked around the rearward end of the trigger. The collar 315 has a hardened metal insert in the form of a beveled lug 318 held in a recess in the periphery of the collar 315 by a screw 320. The collar 315 is split and adjustably secured to the shaft 145 by means of a binder-screw 321. The counter-clockwise rotation of the collar 315 causes the beveled lug 318 to engage the end of the trigger 310 and rock its mounting block 312. Consequently, the shaft 301 is turned in clockwise direction so that the detent-portion 303 of the latch 300 is released from the detent-shoulder 308 on the lifter 290. In this manner the lifter 290 is released to allow the spring 305 to rock its forward end downwardly and release the key 155 for re-engagement with the slot 152 in the disk 143. The oscillating member 142 will thus be keyed to the crank-arm 150 in accordance with the initial connection previously described. Reverse rotation of the shaft 145 causes the beveled lug 318 to ride under the beveled end of the trigger 310 as shown in Fig. 24 to restore the latch 300 to its initial position shown in Fig. 23.

Clutch for intermittent drive to feed rolls

The clutch 325 (Fig. 2) for connecting the intermittent drive shaft 69 with the shaft 63 comprises a toothed clutch-member 326 pinned to the end of the shaft 63 and formed on its radial face with relatively fine teeth 327. The teeth 327 are adapted to be engaged by the teeth 328 on a slidable clutch-member 330 keyed to the drive shaft 69, previously described as driven from the eccentric on the shaft 16 that drives the stitcher-head. The clutch-member 330 is keyed to the shaft 69 and is adapted to be shifted longitudinally thereof by a shipper-fork 331 (Fig. 15) fast on a shaft 332 rotatable in a bearing bracket 333 bolted to the bracket 280, previously mentioned. The vertical arms 334 of the shipper-lever 331 form a fork straddling the clutch-member 330 with pins at their ends carrying shoes 335 engaging in a peripheral slot 336 in said clutch-member 330. The shipper-fork 331 is operated by a relatively long lever 337 fast on the end of the shaft 332 and having its lower end pivotally joined to a link 338 (Fig. 2). The link 338 is connected at its opposite end to the armature 339 of a solenoid S-1 mounted on a bracket 340 bolted to the side of the bed 3 of the machine. A helical spring 341 connected to the lever 337 tends to swing said lever to rock the shipper-fork 331 for shifting the clutch-disk 330 away from its mating disk 326 to disconnect the shaft 69 from the shaft 63. An arm 342 extending laterally from the shaft 332 of the shipper-fork 331 engages with the end of a bolt 343 screwed into a shelf 344 to limit the turning movement of the lever 337 under the tension of the spring 341. It will thus be understood that energization of the solenoid S-1 will cause its armature 339 to rock the lever 337 clockwise to shift the clutch-member 330 into engagement with the cooperating member 326 for connecting the shaft 69 to intermittently index the shaft 63 and thereby impart intermittent rotation to the feed rolls 40 and 41.

*Trip-gauge unit for shifting from high speed drive to intermittent drive for the feed rolls*

Figure 7:
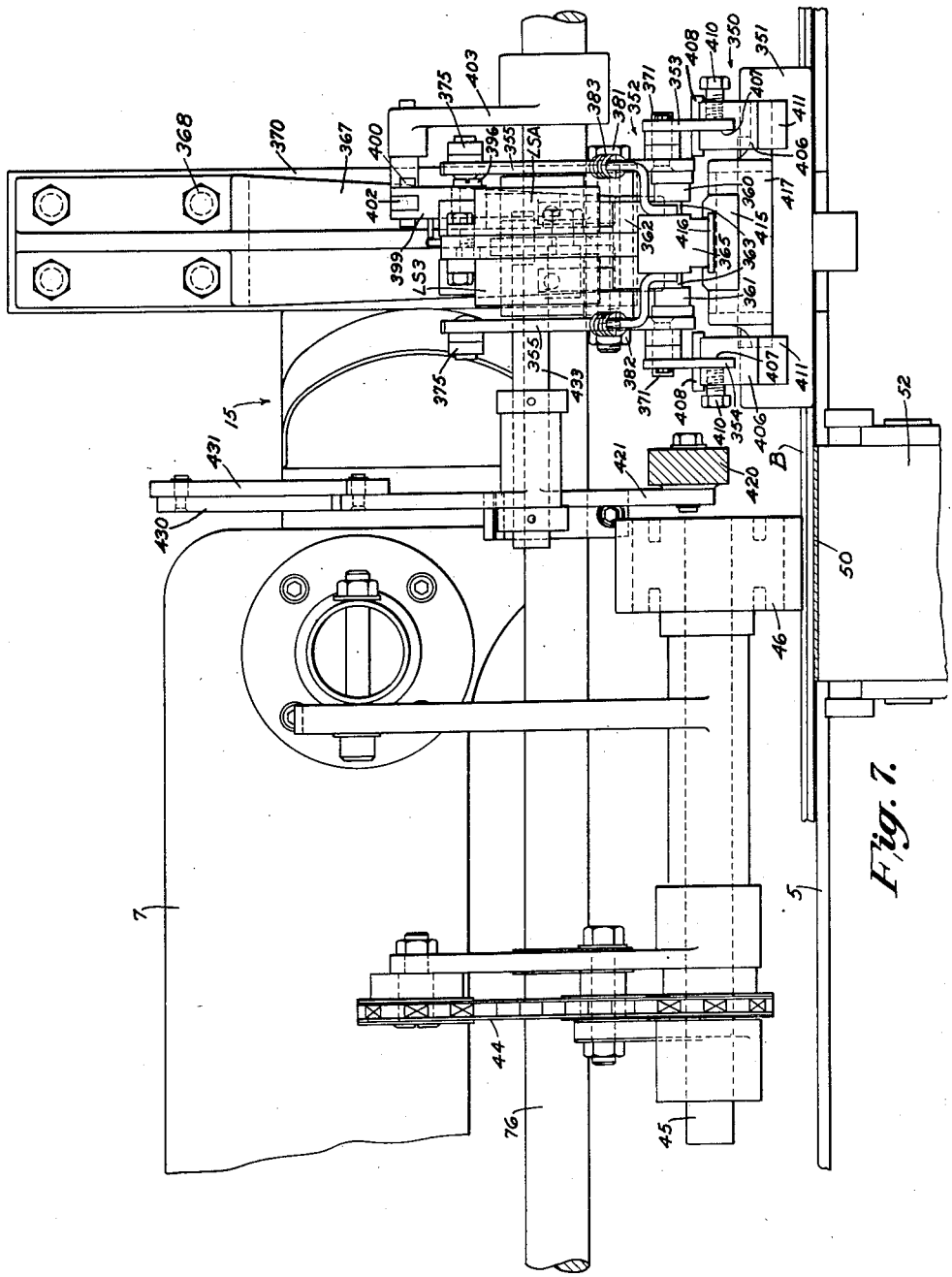
Fig. 7 is a rearward view of the trip-gauge unit shown in Fig. 3 with a portion of its operating mechanism.

Referring particularly to Figs. 3, 4 and 5, the intermittent drive to the feed rolls is initiated automatically by the action of the trip-gauge 350 having a gate 351 for engagement by the feeding blank B. The functioning of this part of the machine is substantially the same as that described in my prior patent but in the present case the construction and method of operation of the gauge is slightly modified from that previously used. The trip-gauge 350 is adjustably mounted on a slidable frame 352 constituted by a pair of longitudinally-extending slotted plates 353 and 354 (Fig. 7) suspended above the horizontal table 5 on which the carton-blanks feed. The laterally-spaced plates 353 and 354 forming the frame 352 are suspended by means of pairs of triangular-shaped plates or arms 355 and 356 which are pivoted at 357 and 358 to slidable bars 360 and 361, also spaced laterally of the table 5. The slidable bars 360 and 361 are connected by cross-strips 362 having laterally-spaced legs 363 at their ends forming saddle-like members. The cross-strips 362 rest on top of a stationary bar 365 to adapt the slidable bars 360 and 361 to slide longitudinally thereof.

The stationary bar 365 is fastened at 366 by welding or otherwise to the downwardly-extending portion of an inclined arm 367 bolted at 368 to a vertical flange 370 forming part of the arm 7 on which the stitcher head is mounted. The triangular arms 355 and 356 are pivotally connected to the slotted plates 353 and 354 at 371 and 372. The upper ends of said arms 355 and 356 are connected by pivot-pins 373 and 374 to links 375 to adapt them to rock in unison in lifting and lowering the frame 352. The frame 352 is raised and lowered by means of a lever 376 fast on the rock-shaft 76 with its outer forked end carrying a pin 377 engaging through a slot 378 in a link 379. The link 379 has a sleeve-like hub 380 for rockably mounting it on a bolt 381 which extends between the triangular arms 355 and is held by a nut 382 at one end.

A spring 383 anchored at 384 adjacent the end of the stationary bar 365 is attached at its opposite end in one of a series of holes 385 in the triangular rocker arm 355. The spring 383 may be adjusted as to any one of the series of holes 385 to counterbalance the weight of the operatnig mechanism that raises the trip-gauge 350. A second spring 386 hooked to a pin in the saddle 363 has its opposite end connected to a pin on the vertical flange 370 to insure return of the frame 352 to its rearward position.

Fastened to the saddle 363 at one end of the slidable bars 360 and 361 are two posts 387 and 388 (Figs. 4–5) through which are threaded screws 389 and 390 for actuating a pair of switches LSA and LS3 mounted on opposite sides of an upright plate 391 supported on the stationary bar 365. The screw 389 operates the plunger of the switch LSA through the intermediary of a lever 395 pivoted on a screw 396 in the plate 391 to which the switch LSA is fastened. A spring 398 anchored at one end to the plate 391 has its opposite end connected to the upper arm 399 of the lever 395, thus tending to rock the lever to the position shown in Fig. 3. A pin 400 in the upper arm 399 of the lever 395 engages through an elongate slot 401 in a link 402, the upper end of which is pivotally connected to an upright lever 403 on the rock-shaft 76.

The switch LSA is connected in circuit (Fig. 35) to energize the solenoid S-3 (Fig. 1) for disconnecting the high speed clutch 30 and also for energizing the solenoid S-1 to connect the toothed clutch 325 for the intermittent drive to the feed rolls. The switch LS3 is connected in circuit with the magnetic clutch 20 for energizing said clutch to connect the pulley 12 to the drive shaft 16 for operating the stitcher-head 15. The screw 390 for actuating the switch LS3 is slightly longer than the screw 389 which actuates the switch LSA and because of the interposition of the lever 395 between the end of the screw and plunger of the switch, the switch LSA is actuated slightly in advance of the actuation of the switch LS3. The purpose of this is to delay the operation of the stitcher-head for a short interval to insure that the step-feed drive to the rolls 40 and 41 will be in operation as the stitcher-head is started to operate. Preferably, suitable braking means is provided for controlling the rotation of the high speed shaft 26, such means being indicated at 405 (Fig. 1) and described in detail in my prior patent, No. 2,305,419, for decelerating the initial rotation of the feed rolls 40 and 41 before starting the intermittent drive for step-by-step feed of the carton-blank.

*Trip-gauge gate unit*

The gate 351, previously mentioned, is in the form of a vertical plate fastened to a pair of brackets 406 slidably mounted for adjustment along the slotted plates 353 and 354. The brackets 406 are bifurcated centrally at 407 to engage the opposite sides of the slotted plates 353 and 354 (Fig. 7) and provided with strips 408 attached at the top thereof which project through the slots 409 to slidably mount the brackets thereon (Fig. 5). Bolts 410 threaded through the sides of the brackets 406 bind against the sides of the plates 353 and 354 for securing the brackets in adjusted position longitudinally thereof. The gate 351 is fastened to a depending portion 411 of the brackets 406 with screws, or by welding, to position it with its lower edge adjacent the top of the table 5 when the trip-gauge 350 is in its operative relationship (Fig. 3).

A guard 415 having its body portion slotted to engage around the edges of a plate 416 on the under side of the stationary bar 365 (Fig. 7) and adapted to slide thereon is formed with a forward depending portion 417 extending upwardly in an inclined plate 419 which serves to strip the blank B from the gate 351 (Fig. 3) as the gate is raised to allow the blank to pass thereby. As a further precautionary measure, a wooden bar 420 (Figs. 5 and 7) movably mounted above the table 5 with its forward end curved upwardly to adapt the blank B to pass thereunder and restrain it from buckling and its forward end passing over the top of the register-gauge gate, later described. The bar 420 is connected to the inclined arm 421 of a lever 422 (Fig. 5) and a similar arm, not herein shown, spaced rearwardly therefrom to adapt it to be lowered into operative position when the trip-gauge 350 is raised into its inoperative relationship shown in Fig. 3. The bar 420 is operated from the rock shaft 76 by a lever 430 fast thereon and connected by a link 431 to the upstanding arm of the lever 422 previously referred to. The lever 422 has its hub pivoted on a stud 433 fast in the downturned portion of the arm 367.

*Control shaft cams for actuating switches LSW and LSX*

The end of the control shaft 145 is rotatably supported by the pointed end of a set-screw 439 engaging a recess in the end of the shaft; the set-screw 439 (Fig. 20) being held in an extension 440 of a bracket 441 (Fig. 2) supporting the bearings 442 and 443 in which the shafts 16 and 24 are journaled. Mounted on this end of the shaft 145 are two cams 444 and 445 (Fig. 19) welded to or connected by a hub 446. The cam 444 abuts the end of a sleeve 447 and the cam 445 is keyed to a rectangular hub 448 of split construction clamped to the shaft 145 by screws 449. A key 450 fastened to the end of the hub 448 by screws 451 engages a slot 452 in the periphery of the cam 445 to connect both cams for rotation with the control shaft 145. The cam 444 is of substantially rectangular contour with a slight recess 453 at one corner, being adapted to engage a rockable block-like member 455 pivotally mounted on the end of a lever 456 (Fig. 20). The lever 456 is pivoted on a pin 457 projecting through a boss 458 on an upright plate-like bracket 460 mounted on the base 3 of the machine frame 6. A spring 461 (Fig. 2) anchored to the bracket 460 by a pin 462 (Fig. 19) has its opposite end connected to the rearward end of said lever 456, thus tending to rock the forward end of said lever upwardly (Fig. 19) to position the block 455 for engagement by the recessed corner of the cam 444. The block 455 is normally held in this position engaged against a pin 465 in the end of the lever 456 by means of a spring 466 anchored to the end of the lever 456 and connected to a pin 467 projecting from the block. The end of the lever 456 carries an adjustable set-screw 468 engageable with the plunger of a switch LSW fastened to the side of the bracket 460. As the control shaft 145 rotates in counter-clockwise direction the edge of the cam 444 will engage the block 455 to depress the lever 456 and thereby actuate the switch LSW which is in circuit with the solenoid S–2. The solenoid S–2 (Figs. 1 and 12), previously mentioned, is employed for rocking the cam 200 (Figs. 13–14) which releases the actuating pawl 186 from the teeth of the ratchet-disk 185. The purpose of pivoting the block 455 on the lever 456 is to permit the point of the cam 444 to pass thereover when the shaft 145 rotates in clockwise direction, as viewed in Fig. 19, the pointed end of the cam engaging in a recess in the top of the block to slide thereacross and rock the block 455 against the tension of its spring 466. This reverse rotation of the cam 444 restores the parts to initial relationship without depressing the lever 456 to re-actuate the switch LSW.

The cam 445 for actuating the switch LSX is of circular contour throughout the greater extent of its circumference (Fig. 19) but interrupted by a flat face 470 that is engageable with a roller 471 (Fig. 20) on the end of a lever 472 similar to the lever 456. The lever 472 is also pivotally mounted on the pin 457, previously described as held in the boss 458 on the bracket 460. A spring 473 (Fig. 19), also anchored to the pin 462, is attached to the rearward end of the lever 472, thus tending to raise its forward end. The lever 472 carries a set screw 474 at its outer end for engagement with the plunger of the switch LSX to close the contacts therein. The switch LSX is attached to the opposite side of the bracket 460 from the switch LSW. The switch LSX is connected in circuit with the solenoid S–5 which is employed to unlock the gate of the register-gauge unit hereinafter described. As shown in Fig. 18 the set-screw 232 in the lever 227 is of slightly less length than the two set-screws 230 and 231 so that normally the switches LS4 and LSY are actuated without contact of the set-screw 232 with the plunger of the switch LS1. Consequently, the switches LS4 and LSY are normally actuated by the movement of the lever 227 without actuation of the switch LS1. However, in case the solenoid S–4 fails to act to release the pawls 186 and 190 from the teeth of the ratchet-disk 185 at the proper moment, the actuating pawl will index one more tooth on the ratchet-disk 185. This action will cause the finger 226 on the member 220 to be advanced on the plate 235 to depress the lever 227 further and cause its set-screw 232 to actuate the safety switch LS1 to open its contacts. As switch LS1 is in circuit with the electric motor 10 opening the contacts of the switch will arrest the operation of the machine.

Another safety switch LSZZ, indicated in the wiring diagram but not illustrated graphically in the drawings, may be located in some convenient location on the machine for manually continuing the rotation of the control shaft 145 to complete its cycle of operation. If the forward movement of the carton-blank B is prevented from any cause so that it fails to reach the gate 490 of the register gauge, later described, the plunger of the safety switch LSZZ may be depressed by the operator to complete the cycle for clearing the machine. The switch LSZZ is in the same circuit with the switch LSZ, previously mentioned, so that when the contacts of the switch LSZZ are opened the solenoid S–2 is de-energized to effect re-engagement of the actuating pawl 186 with the ratchet-disk 185. The indexing of the control shaft 145 will then be continued for one tooth to complete the stitching cycle in the manner as previously explained. In this manner the LSZZ switch functions as a precautionary measure to prevent damage to the operating mechanism of the machine.

*Register-gauge for locating last stitches*

Referring to Figs. 26–32, the elements of the register-gauge unit for accurately locating the final stitch in a single-stitch seam, or next to the last stitch when tie-stitches are being applied, are mounted on a bracket 480 in the form of a saddle straddling a rectangular bar 481 extending horizontally below the conveyor belt 50. The bar 481 is fixedly supported at its ends by brackets 479 (Fig. 27), only one of which is herein shown. The saddle or bracket 480 is adjustable longitudinally of the bar 481 to locate it in operative position in accordance with the length of the blank to be stapled. The bracket 480 is secured in adjusted position on the bar 481 by means of a clamping shoe 482 (Figs. 26–27) at the side of a plate-like extension 483 on the side of the bracket. The shoe 482 is slidable laterally on a pin 484 in the plate 483 to adapt it to be clamped against the bar 481 by means of a square-headed set-screw 485. The bracket 480 is ribbed on its opposite sides with spaced bearings 486 for a shaft 488 held fast therein with a gate 490 rockably mounted thereon. The gate 490 is of bifurcated construction having two upstanding wings 491 and 492 (Fig. 26) connected by a cylindrical hub 493. One wing 491 is constructed with right arms 494 and 495 connected by a cross-piece 496 and having a contact-plate 497 with a recess 500 therein formed by rectangular walls 501 and 502. The opposite wing 492 is of similar construction with its spaced arms 503 and 504 connected by a cross-piece 505. Rockably mounted between the bearing 486 on the bracket 480 and the end of the hub 493 is an arcuately-shaped cam 506 (Fig. 28) provided with a contact-finger 507 extending upwardly in the recess 500 in the wing 491 of the gate 490. The finger 507 serves as the initial contact-element or trigger with which the leading end of the carton-blank B engages as it feeds beyond the stitcher-head 15; it being understood that the blank is supported on the traveling belts 50, previously mentioned, as its leading end reaches the gate 490 (Fig. 28).

The cam 506 is normally held in the position shown in Fig. 28 by means of a spring 510 connected thereto with its opposite end anchored to the lower end of a strip 511 fastened by screws 512 to the end of the bracket 480. The spring 510 tends to rock the cam 506 in counter-clockwise direction to return it to its initial relationship. The upper end of the strip 511 is bent at an angle to form a stop 513 for normally holding the cam 506 with its finger 507 inclined outwardly from the recess 500 in the gate 490. The gate 490 is locked in fixed position for restraining the advance of a blank B for an interval to properly locate the last stitch at the end of a plain seam of single stitches. On the other hand, when tie-stitches are to be applied the gate 490 acts to regulate the position of the next to the last stitch in the seam as later explained.

Figure 26:
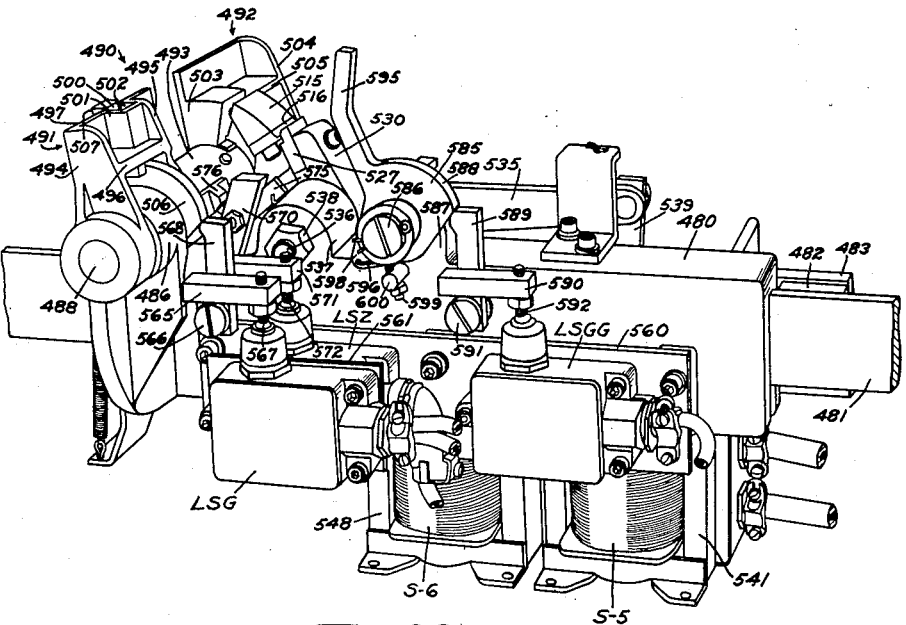
Fig. 26 is a perspective view of the staple-register unit for controlling the placing of the last stitches in the seam.
Figure 29:
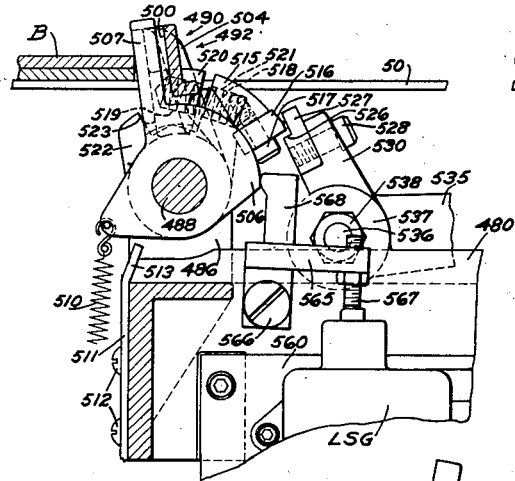
Fig. 29 is a detailed part-sectional view showing the cam for releasing the gate of the register-gauge as actuated by the leading end of the carton-blank.
Figure 30:
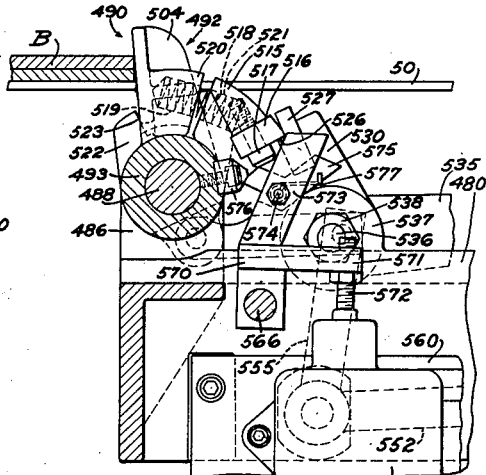
Fig. 30 is a similar part-sectional view showing the gate as locked in operative relationship for locating the last staples.

Cooperating with the gate 490 is a latch 515 rockably mounted on the shaft 488 and provided with a hardened detent-plate 516 secured thereto by screws 517. The latch 515 is rockably mounted on the shaft 488 between the bearings of the arms 503 and 504 of the gate 490. A coiled spring 518 has one end pocketed in a bore 519 in a block-like portion 520 on the rearward side of the gate 490 with its opposite end held in a similar bore 521 in the latch 515. As shown in Fig. 29, the counter-clockwise rocking movement of the gate 490 is limited relatively to the latch 515 by an abutment 522 on the latch which is formed with a shoulder 523 against which the plate-portion of the wing 492 of the gate engages. The end of the detent-plate 516 is adapted to be engaged with the shoulder 526 of a hardened plate 527 fastened by screws 528 to the recessed end of a locking arm 530 (Figs. 29–30). The arm 530 is constituted as part of a bell-crank lever 535 rockable on a bolt 536 having its reduced portion extending through a bearing 537 at the top of the bracket 480 and secured by a nut 538 (Fig. 26). The forked end of the long arm of the bell-crank lever 535 is pivotally connected to a link 539 (Fig. 27), the lower end of which is pivoted to the armature 540 of a solenoid S–5. The frame 541 for supporting the solenoid S–5 is suspended by screws 542 fast in ribbed plates 543 screwed to the side of the bracket 480 (Fig. 27). A spring 545 anchored at its upper end to an elbow-shaped strip 546 fastened to the top of the bracket 480 has its opposite end connected to an offset portion of the link 539 at 547, thereby tending to rock the bell-crank lever 535 clockwise as viewed in Fig. 27. A second solenoid S–6 has its frame 548 suspended from the bracket 480 in the same manner as described with reference to the solenoid S–5. The armature 550 of the solenoid S–6 is connected by a link 551 to the horizontal arm 552 of a bell-crank lever 555 rockably mounted on a stud 556 projecting from the side of the bracket 480. The upright arm of the bell-crank lever 555 is pivotally connected to a link 557 which has its opposite end pivotally connected by a pin 558 to an ear 559 projecting from the bottom of the gate 490. The solenoid S–6 is normally energized to cause its armature 550 to hold the bell-crank lever 555 in the position shown in Fig. 27 with the gate in erect position above the conveyor belts 50.

The purpose of the arcuate cam 506 formed with the finger or trigger 507 will now be explained in connection with Fig. 29. Mounted on a plate 560 fastened to the side of the bracket 480 (Fig. 26) are two switches LSG and LSZ separated by a plate 561. The switch LSG is connected in circuit with the solenoid S–6 and adapted to be actuated by a bell-crank 565 pivoted on a screw 566 with its horizontal arm carrying a set-screw 567 engageable with the plunger of the switch. The upright arm 568 of the lever 565 has a rounded portion engageable by the arcuate rim of the cam 506. Consequently, when the cam 506 is rocked clockwise by engagement of the leading end of the blank B with the finger or trigger 507 the arcuate portion of the cam will ride on the rounded portion of the arm 568 of the lever 565 (Fig. 29) to depress its horizontal arm for engaging the plunger of the switch LSG. The switch LSG is thus actuated to de-energize the solenoid S–6 for freeing the gate 490 to adapt it to be positively locked in operative position (Fig. 30).

The switch LSZ (Fig. 30) is actuated by a bell-crank lever 570 pivoted on the screw 566 previously mentioned as secured in the side of the bracket 480. The horizontal arm 571 of the lever 570 carries a set-screw 572 engageable with the plunger of the switch LSZ. Pivoted on a stud 574 projecting from the side of the inclined upright arm 573 of the lever 570 is an L-shaped pawl 575 having one arm engageable by a hardened beveled projection 576 on the hub 493 connecting the wings of the gate 490. A spring 577 for returning the pawl 575 to initial position is coiled around the stud 574 with one end held in a slot and its other end hooked around the arm of the pawl 575. The purpose of pivotally mounting the pawl 575 is to permit its return without depressing the lever 570 to re-actuate the switch LSZ.

As the gate 490 is moved to lock it in operative position by the engagement of the detent-plate 516 on the latch 515 with the shoulder on the plate 527 of the locking arm 530 of the lever 535, the beveled projection 576 on the hub 493 of the gate 490 will engage the end of the pawl 575 to rock the bell-crank lever 570 (Fig. 30) and thereby depress the plunger of the switch LSZ. The switch LSZ is in circuit with solenoid S–2 which rocks the cam 200 to release the actuating pawl 186 for reengagement with the teeth on the ratchet-disk 185, thereby resuming the indexing of the dial 215 and control shaft 145.

Figure 31:
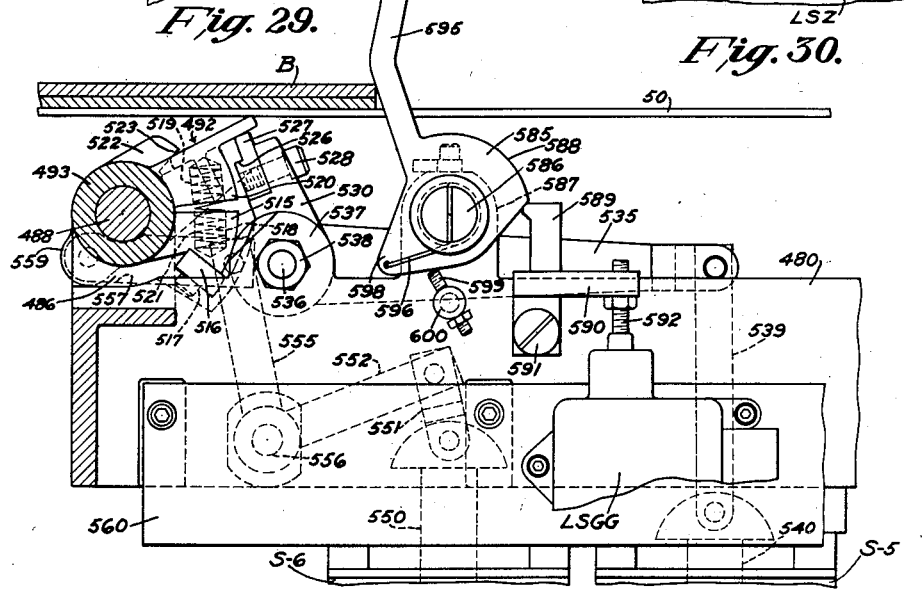
Fig. 31 is a view showing the gate of the register-gauge unit unlocked and depressed to allow passage of the carton-blank.
Figure 32:
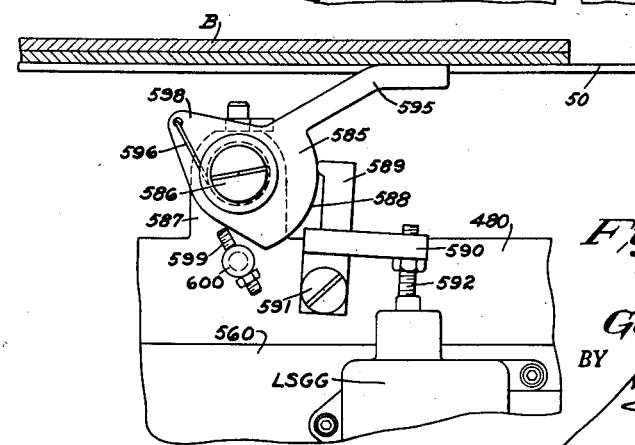
Fig. 32 is a fragmentary view showing the gate solenoid-cam actuated by the feeding blank to open the switch and maintain the solenoid de-energized with the gate in inoperative or open position.

Referring to Figs. 31 and 32, a delay-cam 585 is provided for preventing the return of the register-gauge gate 490 into operative position until the trailing end of the feeding blank B has passed therebeyond. The cam 585 is pivoted on a stud 586 held in a bearing 587 on the bracket 480. The cam 585 has an arcuate face 588 adapted to ride across the rounded end of the upright arm 589 of a bell-crank lever 590 pivoted on a screw 591 held in the side of the bracket 480. The horizontal arm of the lever 590 carries a set-screw 592 engageable with the plunger of a switch LSGG. The switch LSGG is attached to the plate 560 on which the switches LSG and LSZ are mounted as shown in Fig. 26, the last-mentioned switches being eliminated from the showing in Fig. 31 for the sake of clarity. The cam 585 has an angularly-shaped arm 595 which normally projects above the conveyor belts 50 in position to be engaged by the leading end of the feeding carton-blank B after it has passed beyond the gate 490. A spring 596 is coiled around the stud 586 with one end held in a slot in the end thereof and its opposite end hooked through a hole in the triangular arm 598 of the cam. The spring 596 acts to maintain the arm 595 in substantially erect position above the conveyor belts 50 with the triangular arm 598 of the cam 585 engaged with the end of a stop-screw 599 (Fig. 28) adjustable in an abutment 600 projecting from the side of the bracket 480.

The switch LSGG is in the same circuit with the switch LSG, both switches being normally closed to energize the solenoid S–6 in circuit therewith. As viewed in Fig. 31, the gate 490 has been swung downwardly below the conveyor belts 50 to release the blank B. At this point the solenoid S–6 has been de-energized by the opening of switch LSG (Fig. 29). As shown in Fig. 32 the release of the blank B by the gate 490 will cause its advance to rock the lever 595 and turn the cam 585 for rocking the bell-crank lever 590 to open the contacts of the switch LSGG.

After the trailing end of the blank B has passed over and released the arm 507 of the cam 505 the arcuate edge of the cam will ride off from the rounded end of the upright arm of the bell-crank lever 565 to cause it to release the plunger of the switch LSG and allow its contacts to close. However, the circuit remains open at the switch LSGG until the trailing end of the blank has passed over the arm 595 and released the cam 585 to cause the closing of the contacts in the switch LSGG. The circuit will then be completed to energize the solenoid S–6 for returning the gate 490 to operative relationship.

*Method of operation for stitching seam without tie-stitches*

The present improved machine operates in much the same way as the machines of my prior patents referred to above, except that the placing of the last stitch, or for tie-stitch application the next to the last stitch, is controlled by the staple register-gauge. The mechanism of the basic machine is substantially the same as that disclosed in my prior patents with certain necessary modifications hereinabove described. The method of operation of such parts of the machine as are common to disclosures in my prior patents will therefore be explained only briefly herein.

Before starting the operation of the machine the member 220 is turned manually to set the finger 226 for advancing the dial 215 three teeth so that the control shaft 145 will be indexed to that extent before actuating the switches LS4 and LSY to arrest the operation of the machine when the stitching cycle is completed. The location of the first stitch is determined by adjusting the trip-gauge 350 longitudinally of the plates 353, 354 with the distance from the gate 351 to the center of the staple-delivery throat of the stitcher-head 15 corresponding to the distance from the leading edge of the carton-blank B to the desired location of the first stitch.

The location of the last stitch is determined by adjusting the register-gauge unit longitudinally of the bar 481 with the distance from the contact-plate 497 of the gate 490 to the staple-delivery throat of the stitcher-head 15 corresponding to the distance from the leading edge of the carton-blank B to the desired location of the last stitch. The result will be that the first stitches will all be located at the same distance from the leading edges of the blanks and the last stitches will all be located at the same distance from the trailing edges of the blanks; it being understood that the tie-stitch mechanism is inoperative at this time as indicated in Fig. 23.

The machine is driven by the electric motor 10 which is started by closing the manually-operable switch in the circuit from the power line (Fig. 35) to energize the magnetic starter switch M1. The switch M1 supplies current to drive the motor continuously, the necessary connections including the overload switches 10L interposed in the branch circuit being shown in the diagram but not herein described in detail as they are of conventional type.

During the initial stage in the operation of the machine the motor 10 drives through the belt 11 to the fly-wheel 12 and sprocket 21 connected thereto, the fly-wheel and sprocket both being normally free to rotate on the shaft 16. From the sprocket 21 the drive is communicated to the sprockets 23 on the rear shaft 24 (Fig. 1), from which the drive is transmitted through a chain to the sprocket 25 on the so-called high speed shaft 26 carrying the upper feed rolls 40. At this stage the clutch 30 is engaged to connect the shaft 26 to drive through the universally-connected shaft 56 for rotating the stud-shaft 58 whereby the gears 61 and 62 transmit the drive through the shaft 63 and shaft 65 to the shaft 42 carrying the lower rolls 41. At this juncture the arms 68 (Fig. 3) of the cradle carrying the lower rolls 41 are in lowered position so that the two pairs of rolls engage the carton-blank B under relatively light pressure.

The blank B is inserted in the machine for engagement by the rolls 40 and 41 which feed it forwardly on the table 5 at a relatively high rate to advance it to the trip-gauge 350. The leading end of the blank B will immediately encounter the gate 351 of the trip-gauge 350 to slide the frame 352 forwardly against the tension of the spring 386. The forward movement of the frame 352 advances the slide bars 360 and 361 longitudinally to cause the adjustable set-screws 389 and 390 carried thereby to actuate the switches LSA and LS3. The set-screw 389 operates through the lever 395 to engage the plunger of the switch LSA slightly in advance of the engagement of the set-screw 390 with the plunger of the switch LS3, there being thus a short interval of delay between actuation of the two switches during the final advance of the frame 352.

The actuation of the switch LSA by the trip-gauge 350 energizes solenoid S-3 which disengages the clutch 30 on the high speed shaft 26 and also energizes the solenoid S-1 to simultaneously engage the members of the toothed clutch 325 for the intermittent drive to the feed rolls (Fig. 1). Meanwhile, the switch LS3 has been closed by the forward movement of the frame 352 to operate the main clutch 20 by releasing its brake and clutching the fly-wheel 12 to the drive shaft 16 for the stitcher-head 15. Rotation of the shaft 16 causes the cam 80 to depress the lever 77 and rock the shaft 76 (Fig. 5) to swing the lever 376 upwardly. The lever 77 through its connection by the link 379 with the forward pair of triangular arms 355 will rock all four arms upwardly to raise the plates 353 and 354 and thereby lift the gate 351 above the table 5. As the gate 351 is raised to allow continued forward movement of the carton-blank B the spring 386 draws the frame 352 rearwardly to a position above its initial location. During this rearward movement of the frame 352 the set-screw 389 is withdrawn from the lever 395 which still holds the switch LSA closed and the set-screw 390 is retracted from the plunger of the switch LS3 to open its contacts.

The rocking of the shaft 76 also acts through the lever 430 to simultaneously lower the pressure bar 420 to position it for guiding the blank B to the traveling conveyor belts 50. The blank B continues its advance to the conveyor belts 50 on which it is held down by the auxiliary rolls 46. The rocking of the shaft 76 also acts through the levers 75 and 73 to raise the arms 68 of the cradle carrying the lower feed rolls 41 which are thus caused to engage the blank with increased pressure. As the arm 77 is rocked downwardly it is locked by the detent-lever 104 (Fig. 12) to maintain the lower rolls in this relationship. As the rock shaft 76 is rocked by the action of the cam 80 the arm 403 on said shaft acts through the link 402 to hold the lever 395 positively locked against the plunger of the switch LSA (Fig. 5), thereby maintaining the solenoids S-1 and S-3 energized for continuing the operation of the machine through a staple-applying cycle.

Figures 33, 34:
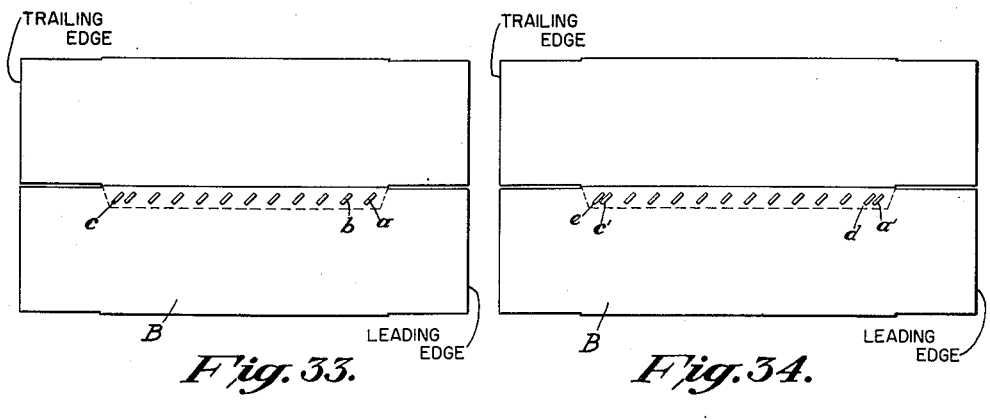
Fig. 33 is a plan view of a carton-blank showing a row of single stitches applied thereto.
Fig. 34 is a similar plan view showing a blank with a stitched seam having closely-spaced tie-stitches applied at the ends of the seam.

When the main clutch 20 is engaged the rotation of the shaft 16 causes the eccentric 140 (Fig. 13) to reciprocate the pitman 141 and oscillate the member 142 on the control shaft 145. The actuating pawl 186 is thus caused to index the ratchet-disk 185 and with it the control shaft 145. The ratchet-disk 185 and control shaft 145 are indexed one tooth per stitch and as the second stitch is applied the cam 444 (Figs. 19–20) on the control shaft 145 will have been brought into action to actuate the switch LSW and close the circuit to energize solenoid S-2. The armature of the solenoid S-2 (Fig. 12) will then rock the lever 205 and through the link 204 will move the cam 200 (Fig. 14) to lift the actuating pawl 186 from the ratchet-disk 185 for arresting further indexing of the control shaft 145. During the indexing of the ratchet-disk 185 two teeth, as above explained, the stitcher-head 15 applies the first two staples $a$ and $b$ spaced as shown in Fig. 33. Thereafter, as the ratchet-indexing means is inoperative the drive-shaft 16 will operate the stitcher-head 15 to apply one staple during the first 180° revolution of said shaft, the spacing of the next staple occurring during the second half revolution, and so on.

*Operation of staple register-gauge*

During the stitching cycle the blank is advanced by the step-feed mechanism until finally its leading end strikes the finger 507 (Fig. 28) to rock the cam 506 as the finger enters the recess 500 in the gate 490. The cam 506 engages the lever 565 (Fig. 29) to cause its set-screw 567 to depress the plunger of the switch LSG to thereby open the contacts for de-energizing the solenoid S-6. This frees the gate 490 to swing forwardly under the pressure of the blank B, thereby causing the latch 515 to engage its detent 516 with the shoulder 526 on the locking lever 530; it being observed that as the gate swings forward it tends to compress the spring 518 which serves as a buffer to relieve the pressure and prevent crushing the blank B at its leading end.

The gate 490 is thus locked in erect relationship as shown in Fig. 30 to momentarily resist further movement of the blank B. In the meantime the forward rocking motion of the gate 490 engages its lug 576 with the pawl 575 to rock the bell-crank lever 570 and thereby cause its set-screw 572 to momentarily actuate the switch LSZ. The switch LSZ de-energizes the solenoid S-2 (Fig. 12) to rock the cam 200 for re-engaging the actuating pawl 186 with the teeth of the ratchet-disk 185 to index the control shaft 145 one more tooth as the last staple is applied to the seam on the blank B.

19

It is to be understood that the leading end of the carton-blank B contacts the gate 490 of the register-gauge unit as the spacing of the last staple is taking place. If the carton-blank B contacts and pushes the latch 515 on the gate 490 to the locking arm 530 of the lever 535 before the last staple-spacing stroke is finished, the feed rolls 40 and 41 will slip on the blank for the balance of the spacing stroke. However, in any case the last staple c (Fig. 33) will be applied as located by the initial adjustment of the register-gauge unit. As the control shaft 145 is indexed for the third tooth, in accordance with the manual setting of the finger 226 on the dial 215, the finger (Fig. 17) will make contact with the plate 235 to depress the lever 227 and cause the set-screws 230 and 231 to actuate the switches LS4 and LSY. The switch LSY energizes the solenoid S-4 (Fig. 11) to cause its armature to rock the bell-crank lever 130 and through the connecting link 117 it swings the cam-plate 120 to disengage both pawls 186 and 190 (Fig. 14) from the teeth on the ratchet-disk 185. The disengagement of the check-pawl 190 permits the dial 215 (Fig. 18), the member 220 and the control shaft 145 to be returned to first or neutral position by the clock-spring 250. Simultaneously, the switch LS4 closes the circuit to operate the brake element in the main clutch 20 (Fig. 2) and disengage the clutch from the fly-wheel 12 on the shaft 16 to arrest the operation of the stitcher-head 15. Simultaneously with the actuation of the switches LS4 and LSY, the cam 445 (Fig. 19) will depress the lever 472 to actuate the switch LSX and energize the solenoid S-5 to rock the bell crank lever 535 (Fig. 31) for releasing the gate 490. This allows the blank B to continue its advance into contact with the upstanding arm 595 of the delay-cam 585, thereby rotating the cam to rock the lever 590 to actuate the switch LSGG.

The actuation of the switch LSGG keeps the circuit to solenoid S-6 open until the trailing end of the blank B passes beyond the delay-cam 585 and releases its arm 595 to allow the cam to be returned to first position by its spring 596. The cam 585 then releases the lever 590 to cause the closing of the switch LSGG. The cam 506 is released as the trailing end of the blank B passes beyond its finger 507, being restored to first position by the spring 510 and the gate 490 is also swung back to first position as the solenoid S-6 is energized by the closing of switches LSG and LSGG; it being understood that the return of the cam 506 releases the lever 565 for closing the contacts of the switch LSG to re-energize the solenoid S-6.

The carton-blank B having passed the delay-cam 585 is conveyed on the belts 50 to deliver it from the machine for stacking with other blanks or transport to other apparatus. It will be understood that as the switch LSY (Figs. 17–18) is actuated by the lever 227 to energize the solenoid S-4 for rocking the lever 130 to slide the link 117 (Figs. 11–12) and disengage the pawls 186 and 190 from the ratchet-disk 185, the end of said link will engage the end of the screw 111 and rock the detent-lever 104. The lever 104 thereby unlocks the member 96 to release the lever 77 and allow it to swing upwardly as the cam 80 on the shaft 16 is turned to the position shown in Fig. 11. The shaft 76 is thereby rocked back to its first position shown in Fig. 3 to cause the arm 403 to act through the link 402 for rocking the lever 395 to disengage it from the plunger of the switch LSA. The circuit is thereby opened to de-energize the solenoid S-1 which disengages the toothed clutch 325 and also to de-energize the solenoid S-3 for engaging the clutch 30 for driving the high speed shaft 26. The feed rolls will then be driven at high speed for delivering the stitched blank to the conveyor belts 50 and the machine prepared for feeding the next blank applied to the machine into position for stitching its seam.

20

Operation of machine for applying tie-stitches

When it is desired to apply a tie-stitch at each end of the seam the tie-switch mechanism is set by adjusting the finger 226 (Fig. 17) for advancing the dial 215 four teeth before the switches LS4 and LSY are actuated to arrest the operation of the machine. The trip-gauge 350 and the staple register-gauge unit are adjusted to the same position as when applying single stitches for a plain seam. It is also necessary to manually lock the tie-stitch mechanism in operative relationship (Fig. 21) by engaging the detent-shoulder 308 on the lifter 290 with the detent-projection 303 on the spring-operated latch member 300.

The split collar 315 is manually adjusted to cause its lug 318 (Fig. 22) to engage and rock the trigger 310 for releasing the latch 300 as the control shaft is being indexed for the second stitch. The cam 295 is also adjusted angularly of the control shaft 145 so that it will engage the insert 293 on the lifter 290 as the third tooth is being indexed after the start of the stitching cycle; it being understood that the application of the tie-stitches is accomplished automatically without further manual adjustment of the mechanism.

After the manual adjustment of the tie-stitch mechanism the machine is started to operate by closing the main switch to actuate the magnetic starter switch M1 for the motor 10. It will be understood that the drive of the machine is connected to rotate the feed rolls at high speed and as a blank is applied to the machine and feeds to the trip-gauge 350 the clutches will be shifted to transfer the drive to the stitcher-head and connect the intermittent drive to the feed rolls.

During the initial 180° of the first revolution of the stitcher shaft 16 the first staple a' is applied to the blank B (Fig. 34) and the ratchet-disk 185 is indexed one tooth. At the next 180° revolution of the shaft 16 the blank is advanced to a relatively short or tie-stitching space by the key 155 (Figs. 22–25) being released from the slot 152 in the oscillating member 143. The manual adjustment of the mechanism for locking the lifter 290 in raised as previously explained raised the key 155 from the slot 152 in the disk 143 of the oscillating member 142 (Fig. 25) so that lost motion occurs before the screw 158 strikes the key 155 to rock the crank-arm 150. In this way the lost motion between the oscillating member and the crank-arm 150 reduces the angular motion of the shaft 69 and thereby the extent of feed of the blank by the rollers 40 and 41 is reduced.

During the initial 180° of the second revolution of the shaft 16 of the second staple is applied to provide the tie-stitch d (Fig. 34) which is spaced a short distance from the first-applied staple a' as the ratchet-disk 185 is indexed a second tooth. As the ratchet-disk 185 is being indexed the second tooth the rotation of the control shaft 145 causes the lug 318 on the collar 315 (Fig. 22) to engage and rock the trigger 310 to thereby disengage the latch 300 from the lifter 290 and allow its forward end to release the key 155 for reengagement with the slot 152 in the disk 143. The oscillating member 142 will then be keyed to the crank-arm 150 to adapt it to rotate the shaft 69 and rolls 40 and 41 to feed the blank for spacing the staples to the normal extent. As the control shaft 145 is indexed the second tooth by the ratchet-disk 185 of the cam 444 (Figs. 19–20) is brought into action to cause its recessed point 453 to rock the member 455 and depress the lever 456 for momentarily actuating the switch LSW. Actuation of the switch LSW energizes the solenoid S-2 (Fig. 12) to rock the cam 200 for disengaging the actuating pawl 186 from the teeth of the ratchet-disk 185 which thereby arrests the rotation of the control shaft 145.

As the carton-blank B advances the staples are applied by the stitcher-head and spaced at regular intervals in the seam in the same manner as explained for a plain seam. When the leading end of the blank B contacts the finger 507 (Fig. 29) it rocks the cam 506 to actuate the switch LSG and de-energize the solenoid S–6. The register-gauge gate 490 is thus freed to rotate slightly and engage its lug 576 with the pawl 575 for rocking the bell-crank lever 570 to actuate the switch LSZ. Actuation of the switch LSZ de-energizes the solenoid S–2 to cause the cam 200 to release the actuating pawl 186 for re-engagement with the ratchet-disk 185 so as to resume indexing of the control shaft 145. As the ratchet-disk 185 indexes the control shaft 145 a third tooth the rotation of the cam 295 (Fig. 22) will cause it to ride under the member 293 and rock the lifter 290 to engage its shoulder 308 (Fig. 23) with the detent 303 on the latch 300, thereby locking the tie-stitch mechanism in operative relationship. The lifter 290 thus raises the key 155 from the slot 152 so that the crank-arm 150 is again actuated with lost motion. Lost motion between the oscillating member 142 and the crank-arm 150 reduces the angular motion of the shaft 69 and correspondingly limits the extent of feed of the blank B by the rollers 40 and 41. At this juncture the cam 445 (Fig. 19) on the control shaft 145 comes into action to depress the lever 472 and actuate the switch LSX to energize the solenoid S–5. The solenoid S–5 will then rock the bell-crank lever 535 (Fig. 27) to unlock the gate 490 and free it to swing downwardly for permitting the blank B to advance. It is to be understood that if the leading end of the blank B contacts and rocks the gate 490 to lock it in engagement with the lever 535 before the next-to-the-last staple-spacing stroke is completed, the rollers 40 and 41 will slip on the blank for a short interval as their drive continues. However, in any case, the next-to-the-last staple will be applied as accurately located in accordance with the initial adjustment of the register-gauge unit.

As the tie-stitch staple e (Fig. 34) is applied to the seam the ratchet-disk 185 indexes the control shaft 145 the fourth tooth in accordance with the manual setting of the finger 226 on the dial 215 to depress the lever 227 and actuate the switches LS4 and LSY. The switch LSY energizes the solenoid S–4 to rock the cam-plate 120 and disengage both pawls 186 and 190 from the teeth on the ratchet-disk 185. Consequently, the release of the check-pawl 190 will allow the ratchet-disk 185, dial 215, member 220 and the control shaft 145 to be returned to first or neutral position by the clock-spring 250.

In the meantime the carton-blank B has advanced into contact with the arm 595 of the delay-cam 585, thereby rotating said cam to rock the lever 590 and actuate the switch LSGG in the circuit to the solenoid S–6. The switch LSGG is actuated to open its contacts and prevent the return of the gate 490 before the trailing end of the blank B has passed therebeyond. The contacts of the switch LSGG remain open until the trailing end of the blank B passes beyond the delay-cam 585 (Fig. 32) and releases its arm 595 to allow it to be returned to first position for closing the switch LSGG. The cam 506 is not released to swing back to first position until the trailing end of the blank passes beyond its finger 507 and the cam then acts to close the switch LSG. The gate 490 is swung back to first position as the trailing end of the blank B passes beyond the arm 595 of the cam 585 to close the switch LSGG and energize the solenoid S–6. Simultaneously with the actuation of the switch LSY, the switch LS4 is actuated to operate the brake in the main clutch 20 and disconnect the clutch from the flywheel 12 on the shaft 16 to arrest the operation of the stitcher-head 15. The control mechanism is then in op erative relationship for driving the feed rolls 40 and 41 at high speed so that another blank may be inserted in the machine and fed to actuate the trip-gauge 350 for shifting the clutches and initiating the operation of the stitcher-head 15. The feed rolls will then be driven intermittently to advance the blank B step-by-step for applying stitches thereto in a seam in the same manner as above explained.

It will be observed from the foregoing specification that the present invention provides a completely automatic machine for stitching the manufacturer's seam in the folded blanks of slotted containers or corrugated board boxes. The carton-blanks may be supplied to the machine manually or delivered thereto by an automatic folder with practically no attention required on the part of the operator. The present improvement is designed particularly to insure the placing of the last stitch in the seam in the required spaced relation to the end of the carton-blank and to prevent the stitch overrunning the edge of the box.

While the improvements are herein shown and described by way of example as applied to a particular type of machine, it is to be understood that modifications may be made in the construction and arrangement of the mechanism without departing from the scope of the invention as expressed in the following claims. Therefore, without limiting myself in this respect, I claim:

1. In a wire-stitching machine, in combination with means for applying stitches to a carton-blank and and means for feeding the blank step-by-step relatively to said stitching means to space the stitches at predetermined intervals in a seam, means engageable by leading end of the feeding blank after a predetermined number of stitches have been applied thereto, and means operated threby to control said feeding means to accurately locate the last stitch in the seam spaced at a proper distance from the end of a carton formed by said blank.

2. In a wire-stitching machine in combination with means for applying stitches to a carton-blank and means for feeding the blank intermittently relative to said stitching means to apply the stitches in spaced relationship, means engageable by the leading end of the feeding blank after a series of stitches have been applied thereto to control said feeding means for regulating the extent of advance of the blank to accurately locate the last stitch ulating the extent of advance of the blank to accurately in the seam spaced at a proper distance from the end of the carton formed by the blank.

3. In a wire-stitching machine comprising a stitcher-head, means for feeding a carton-blank intermittently relatively to said stitcher-head and means for operating the stitcher-head to apply the stitches in spaced relationship in a seam, the combination therewith of means engageable by the leading end of the blank for controlling its advance by the feeding means to accurately locate the last stitch in the blank in proper spaced relation to the end of a carton formed by said blank.

4. In a wire-stitching machine comprising a stitcher-head, means for intermittently feeding a carton-blank relatively to said stitcher-head, and means for operating the stitcher-head to apply the stitches in spaced relation in a seam, the combination therewith of means engageable by the leading end of the feeding blank after a plurality of stitches have been applied thereto, and means operated thereby to control the extent of the final advance of the blank before the last stitch is applied to the seam to accurately locate said last stitch in proper spaced relation to the end of the carton formed by said blank.

5. In a machine having means for applying wire staples to carton-blanks, means for intermittently feeding a carton-blank to apply the staples thereto in spaced relation in a seam, an abutment in the path of the feeding blank adapted to be engaged by the leading end of the blank before the last staple is applied to the seam, means for displacing the abutment after the last staple has been applied to permit feeding of the blank to deliver it from the machine, and means operative after the trailing end of the blank has passed the abutment to restore said abutment to operative position for engagement by the next blank being stapled.

6. In a wire-stitching machine comprising means for applying wire stitches to a carton-blank, means for intermittently feeding a blank to apply the stitches thereto in spaced relationship in a seam, a gate engageable by the leading end of the blank after a series of stitches have been applied thereto, and means operated thereby for controlling the further advance of the blank by the feeding means to accurately locate the last stitch in the seam at a proper distance from the end of the carton formed by said blank.

7. In a machine of the character indicated having means for applying wire stitches in a seam, means for feeding a carton-blank relatively to said stitching means, and means operative thereafter for feeding the blank intermittently to apply the stitches in spaced relationship in the seam, the combination therewith of a movable gate engageable by the feeding blank to restrict its feed at the end of the seam, means operated by said gate to arrest the operation of the stitching means after applying the last stitch in the seam, and means for moving the gate to release the stitched blank for delivery from the machine.

8. In a machine of the character indicated having a stitcher-head for applying wire-stitches to carton-blanks, means for feeding a blank to the stitcher-head and means operative thereafter for intermittently feeding said blank to apply the stitches in spaced relationship in a seam, the combination therewith of a gate engageable by the feeding blank for momentarily arresting its feed to accurately locate the last stitch in the seam at a distance from the end of a carton formed by the blank, and means for operating the gate to release the blank and arrest the operation of the stitcher-head.

9. In a machine of the character indicated having means for applying wire stitches in a seam and means for intermittently feeding a carton-blank relatively of the stitching means to apply the stitches in spaced relationship in a seam, the combination therewith of a gate engageable by the leading end of the feeding blank for momentarily arresting its feed, electrically-actuated means for maintaining said gate in operative relationship, means operable by contact of the blank to release said electrical means, and means operative thereafter by the continued advance of the blank to return the gate into operative relationship after the trailing end of the blank has passed thereover.

10. In a stapling machine having means for applying staples to a carton-blank, means for feeding the blank with a step-by-step advance to apply the staples in spaced relationship in a seam, a gate located in the path of said feeding blank, electrically-operated means for holding said gate in operative relationship, contact means engageable by the blank to release the electrical means, means for locking said gate after it release by the electrical means, means operative to release said locking means to permit the gate to be moved out of operative position, and means for returning the gate to operative relationship after the trailing end of the feeding blank has passed therebeyond.

11. In a wire-stitching machine comprising means for applying staples to the seam of a carton-blank and means for feeding said blank intermittently to space said staples in the seam, the combination therewith of a movable gate normally positioned in the path of the feeding blank and engageable by the leading end thereof, electrical means for initially maintaining said gate in operative relationship, a contact member engageable by the blank for releasing the gate to allow it to be moved out of operative position, means for retaining said gate in released position until the feeding blank has passed thereby, and means operative for returning the gate to its initial operative position after the trailing end of the feeding blank has passed thereby to position it for engagement by the next blank during its advance for applying stitches thereto.

12. In a machine having stitching means for applying wire staples to carton-blanks and means for intermittently feeding a blank to space the staples in a seam, control means for indexing the feeding means to apply the first and last stitches in the seam, a gate engageable by the feeding blank before the last stitch is applied to locate said stitch relatively to the end of the blank, means for maintaining the gate in operative relationship for engagement by the leading end of the blank, means for locking the gate to restrict its movement by contact of the blank therewith, means operated by the initial movement of the gate to arrest the operation of the indexing means, means operative thereafter to release the gate-locking means to adapt the gate to be moved for permitting the blank to pass thereby, and means operated after the blank has passed beyond the gate to return the gate to operative position and restore the indexing means for operation to control the application of the first staple in the next succeeding blank fed to the stitching means.

13. In a machine comprising means for applying staples to the seam of a folded container blank and means for feeding said blank step-by-step to space the staples in the seam, the combination of a pivoted gate for arresting the advance of the blank at the end of the seam, means engageable by the blank for locking the gate in operative relationship, means actuated by the blank for releasing said locking means to adapt the gate to swing open for continuing the advance of the blank, and means actuated by the blank after its trailing end has advanced past the gate to return said gate into operative relationship.

14. In a wire-stitching machine comprising staple-applying means and means for feeding a carton-blank step-by-step for applying the staples thereto in spaced relationship in a seam, the combination of a gate engageable by the feeding blank to resist its advance at the end of the seam, means operative by the blank after its engagement with the gate to arrest the operation of the step-feeding means, means operative by the blank to release the gate to allow the blank to pass thereby, means for feeding the blank beyond the gate to deliver it from the machine, means for returning the gate to operative position, and means operated by the feeding blank to delay the return of the gate until the trailing end of the blank has passed beyond the gate.

15. In a machine as defined in claim 6, locking means for maintaining the gate in operative relationship, means actuated during the initial movement of said gate by the feeding blank to engage said gate-locking means, means operated from the drive of the machine to release the gate-locking means after the last stitch is applied to the seam whereby to free the gate to swing open, and means operated after the trailing end of the blank has passed thereby to return the gate to initial operative position.

16. In a machine as defined in claim 6, the combination of electrical means for normally holding the gate in operative relationship, contact means on said gate for releasing said holding means, means actuated by an initial movement of the gate to lock said gate in operative relationship, means operative in timed relation with the means for applying the stitches to a carton-blank for unlocking the gate to allow it to open for the blank to pass thereby, and means located a distance beyond said gate and engageable by the blank as it feeds therefrom for delaying the release of the gate-locking means until the trailing end of the blank has passed by said last-named means.

17. In a machine as defined in claim 8, the combination of means located at a distance beyond the gate for engagement by the feeding blank after its release from the gate, and means actuated thereby subsequent to the release of the blank when its trailing end has passed thereby to return the gate to initial operative position.

18. In a wire-stitching machine, in combination with means for applying stitches to a carton-blank and means for feeding the blank step-by-step relatively to said stitching means to space the stitches at predetermined intervals in a seam, means operated by engagement with the leading end of the feeding blank to control said feeding means to accurately locate the next-to-the-last stitch in the seam relatively to the end of the blank, and means for applying the final stitch at the end of the seam a relatively short distance from the previously-applied stitch to form a tie-stitch.

19. In a wire-stitching machine comprising a stitcher-head, means for feeding a carton-blank to said stitcher-head, and means for feeding said blank step-by-step to apply the stitches thereto in spaced relationship in a seam, the combination therewith of means operated by engagement with the leading end of the feeding blank for controlling the blank-feeding means to accurately locate the next-to-the-last stitch in the seam, and means for applying a tie-stitch spaced at a reduced distance from said next-to-the-last stitch of the seam.

20. In an automatic machine having a stitcher-head for applying wire-stitches to carton-blanks and means for feeding a blank step-by-step relatively to said stitcher-head to apply the stitches in uniformly spaced relation in a seam, the combination therewith of means operated by engagement with the leading end of the feeding blank for accurately locating the next-to-the-last stitch in the seam, and means for applying a tie-stitch at the end of the seam spaced at a reduced distance from said next-to-the-last stitch.

21. In a machine comprising means for applying staples to the seam of a folded container-blank, and means for feeding said blank step-by-step to space the staples uniformly in a seam, the combination of a gate for arresting the advance of the blank at the end of said seam to accurately locate the next-to-the-last staple in the seam, and means operative thereafter for applying an additional staple at the end of the seam spaced at a relatively short distance from said next-to-the-last stitch to form a tie-stitch at the end of the seam.

22. In a machine of the character indicated having a stitcher-head for applying wire-stitches to a carton-blank and means for intermittently feeding said blank relatively of the stitcher-head to apply the stitches in spaced relationship in a seam, the combination therewith of means engageable by the leading end of the feeding blank for indexing the feeding means to accurately locate the next-to-the-last stitch in the seam relatively of the end of said blank, and means for applying a final stitch at a relatively short distance from the next-to-the-last stitch to provide a tie-stitch at the end of the seam.

References Cited in the file of this patent
UNITED STATES PATENTS

| | | |
|---|---|---|
| 2,264,776 | Spiller | Dec. 2, 1941 |
| 2,305,418 | Harred | Dec. 15, 1942 |
| 2,317,298 | Pabich | Apr. 20, 1943 |
| 2,317,308 | Spiller | Apr. 20, 1943 |
| 2,509,870 | Larsson | May 30, 1950 |